US010379620B2

(12) United States Patent
Tanaka et al.

(10) Patent No.: US 10,379,620 B2
(45) Date of Patent: Aug. 13, 2019

(54) FINGER MODEL VERIFICATION METHOD AND INFORMATION PROCESSING APPARATUS

(71) Applicant: FUJITSU LIMITED, Kawasaki-shi, Kanagawa (JP)

(72) Inventors: Shota Tanaka, Kawasaki (JP); Naoyuki Nozaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 546 days.

(21) Appl. No.: 15/163,043

(22) Filed: May 24, 2016

(65) Prior Publication Data
US 2016/0378893 A1 Dec. 29, 2016

(30) Foreign Application Priority Data

Jun. 25, 2015 (JP) ................................. 2015-127866

(51) Int. Cl.
B25J 9/16 (2006.01)
G06F 3/01 (2006.01)
(Continued)

(52) U.S. Cl.
CPC .............. *G06F 3/017* (2013.01); *G06F 3/011* (2013.01); *G06F 3/038* (2013.01); *G06F 3/0346* (2013.01); *G06F 3/03545* (2013.01)

(58) Field of Classification Search
CPC .... G06F 3/017; G06F 3/03545; G06F 3/0346; G06F 3/011; G06F 3/038; B25J 9/1671
See application file for complete search history.

(56) References Cited

U.S. PATENT DOCUMENTS 9,333,649 B1 *  5/2016  Bradski ................... B25J 9/163
2002/0008720 A1 *  1/2002  Hiraki ................. G06F 3/04842
                                                        715/848
(Continued)

FOREIGN PATENT DOCUMENTS

JP    2001-325611    11/2001
JP    2009-172685     8/2009
JP    2014-240106    12/2014

OTHER PUBLICATIONS

Miller et al. "Grasplt! A Versatile Simulator for Robotic Grasping" IEEE Robotics and Automation Magazine, Dec. 2004, p. 110-122 [retrieved on Oct. 23, 2018]. Retrieved from <https://ieeexplore.ieee.org/abstract/document/1371616/> (Year: 2004).*

(Continued)

*Primary Examiner* — Aniss Chad
*Assistant Examiner* — Alfred H B Wechselberger
(74) *Attorney, Agent, or Firm* — Staas & Halsey LLP

(57) ABSTRACT

An information processing apparatus includes a processor configured to generate, in a simulation space, a rectangular parallelepiped surrounding a target part among a plurality of parts. The target part is taken by a human body. The rectangular parallelepiped has surfaces in contact with a maximum outer shape of the target part. The processor is configured to identify, among the surfaces of the generated rectangular parallelepiped, surfaces other than a surface in contact with a part different from the target part, and select combinations of two surfaces among the identified surfaces. The processor is configured to identify, among the selected combinations, a combination which satisfies a condition that a vector from a point of a first finger to a point of a second finger penetrates the rectangular parallelepiped when the two surfaces in the combination are taken by the two fingers. The two fingers are included in the human body.

4 Claims, 23 Drawing Sheets

(51) Int. Cl.
*G06F 3/038* (2013.01)
*G06F 3/0346* (2013.01)
*G06F 3/0354* (2013.01)

(56) References Cited

U.S. PATENT DOCUMENTS

| | | | | |
|---|---|---|---|---|
| 2004/0010346 A1* | 1/2004 | Stewart | ............... | G06F 3/011 700/255 |
| 2009/0144664 A1* | 6/2009 | Kramer | ............... | G06T 19/20 715/852 |
| 2011/0010009 A1* | 1/2011 | Saito | ............... | B25J 9/1612 700/253 |
| 2013/0184860 A1* | 7/2013 | Ota | ............... | B25J 9/1669 700/245 |
| 2013/0184870 A1* | 7/2013 | Ota | ............... | B25J 9/1669 700/262 |
| 2015/0019013 A1* | 1/2015 | Rose | ............... | G01L 1/16 700/258 |

OTHER PUBLICATIONS

Tomovic et al. "A Strategy for Grasp Synthesis with Multifingered Robot Hands" 1987 IEEE International Conference on Robotics and Automation; doi: 10.1109/ROBOT.1987.1087842 [retrieved on Oct. 23, 2018]. Retrieved from <https://ieeexplore.ieee.org/abstract/document/1087842/> (Year: 1987).*

Huebner et al. "Minimum Volume Bounding Box Decomposition for Shape Approximation in Robot Grasping" 2008 IEEE International Conference on Robotics and Automation: Pasadena, CA (2008) [retrieved on Oct. 24, 2018]. Retrieved from <https://ieeexplore.ieee.org/abstract/document/4543434/> (Year: 2008).*

Rijpkema et al. "Computer Animation of Knowledge-Based Human Grasping" Computer Graphics, vol. 25, No. 4 (1991), pp. 339-348 [retrieved on Oct. 25, 2018]. Retrieved from <https://dl.acm.org/citation.cfm?id=122754> (Year: 1991).*

Roberts, K. "Coordinating a Robot Arm and Multi-finger Hand Using the Quaternion Representation" Proceedings., IEEE International Conference on Robotics and Automation; DOI: 10.1109/ROBOT.1990.126170 [retrieved on Oct. 23, 2018]. Retrieved from <https://ieeexplore.ieee.org/abstract/document/126170> (Year: 2002).*

Rijpkema et al. "Computer Animation of Knowledge-Based Human Grasping" Computer Graphics, vol. 25, No. 4 [retrieved on Oct. 25, 2018]. Retrieved from <http://apc.dcti.iscte.pt/praticas/Rijpkema,%20Girard%20-%20Computer%20animation%20of%20knowledge-based%20human%20grasping.pdf> (Year: 1991).*

Watanabe et al. "Grasp Motion Planning for box opening task by multi-fingered hands and arms" 2009 IEEE Intl Symposium on Computational Intelligence in Robotics and Automation; DOI: 10.1109/CIRA.2009.5423226 [retrieved on Apr. 11, 2019]. Retrieved from <https://ieeexplore.ieee.org/document/5423226> (Year: 2010).*

Agovic et al. "Grasp Planning by Alignment of Pairwise Shape Descriptorss" 2009 IEEE/RSJ International Conference on Intelligent Robots and Systems [retrieved on Apr. 11, 2019]. Retrieved from <https://dl.acm.org/citation.cfm?id=1733040> (Year: 2009 ).*

Goldfeder et al. "Grasp Planning via Decomposition Trees" FrE4.1, 2007 IEEE International Conference on Robotics and Automation [retrieved on Apr. 12, 2019]. Retrieved from <https://ieeexplore.ieee.org/abstract/document/4209818> (Year: 2007).*

Chen et al. "Finding Antipodal Point Grasps on Irregularly Shaped Objects" IEEE Transactions on Robotics and Automation, vol. 9. No. 4, pp. 507-512 [retrieved on Apr. 12, 2019]. Retrieved from <https://ieeexplore.ieee.org/document/246063> (Year: 1993).*

Farooqi et al. "Online construction of the manipulation model of an unknown object by a robot hand using . . . " Adv Robotics, vol. 14, No. 2, pp. 135-151 [retrieved on Apr. 11, 2019]. Retrieved from <http://search.ebscohost.com/login.aspx?direct=true&db=syh&AN=4395323&site=ehost-live&scope=site> (Year: 2000).*

* cited by examiner

FIG.7

| PART | MINIMUM VALUE | | | DIMENSION | | | |
|---|---|---|---|---|---|---|---|
| | X | Y | Z | X | Y | Z | |
| p1 | -204 | 9.6 | -143 | 408 | 3.1 | 508 | ~701-1 |
| p2 | -15.0 | 9.6 | -303.0 | 15.5 | 51.7 | 23.0 | ~701-2 |
| : | : | : | : | : | : | : | |

| ARM | POSTURE | | | POSITION | | | JOINT | JOINT VALUE | | |
|---|---|---|---|---|---|---|---|---|---|---|
| | x | y | z | x | y | z | | MINIMUM VALUE | MAXIMUM VALUE | SETTING VALUE |
| am | 0 | 90 | 60 | -300 | -200 | -100 | j1 | 0 | 60 | 60 |
| | | | | | | | j2 | 0 | 90 | 90 |
| | | | | | | | j3 | 0 | 90 | 90 |
| | | | | | | | j4 | 0 | 90 | 90 |
| | | | | | | | .. | .. | .. | .. |

612

1001-1, 1001-2, 1001-3, 1001-4, ...

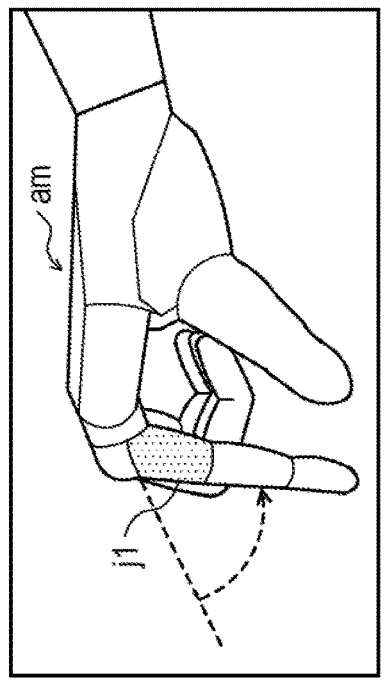
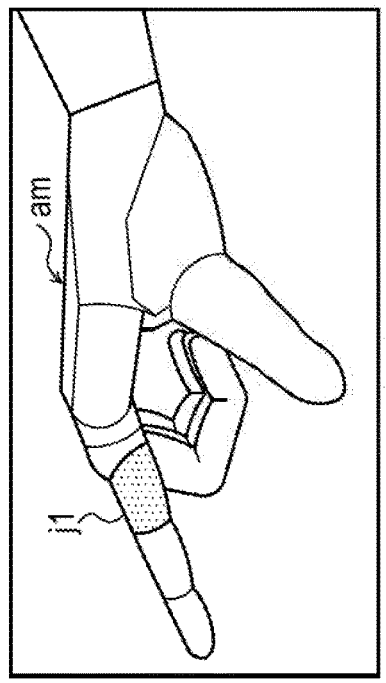
FIG.11

FIG.12
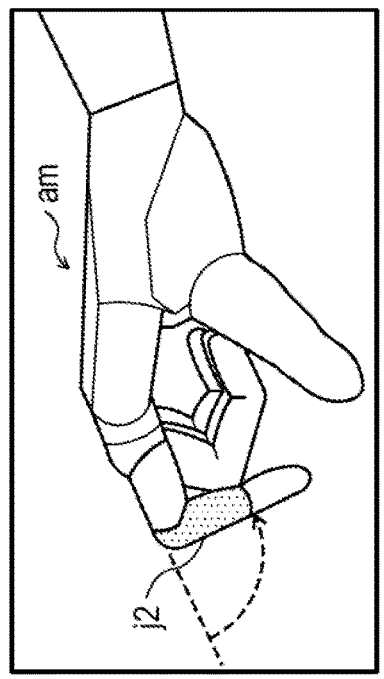
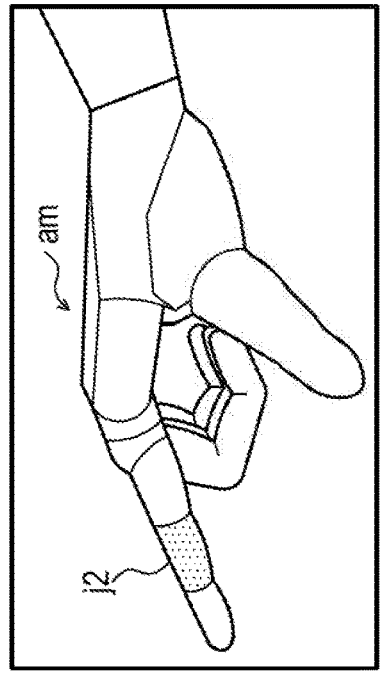

FIG.13
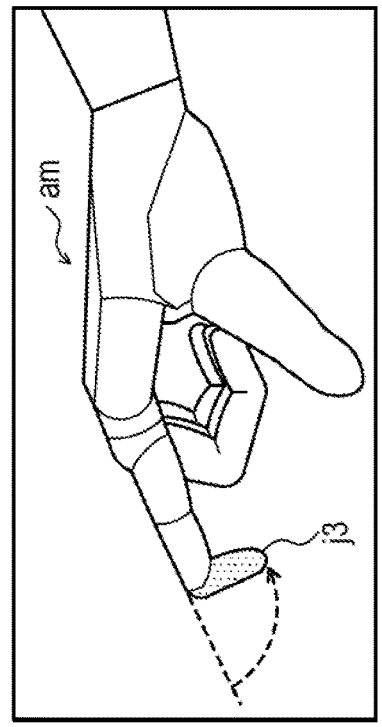
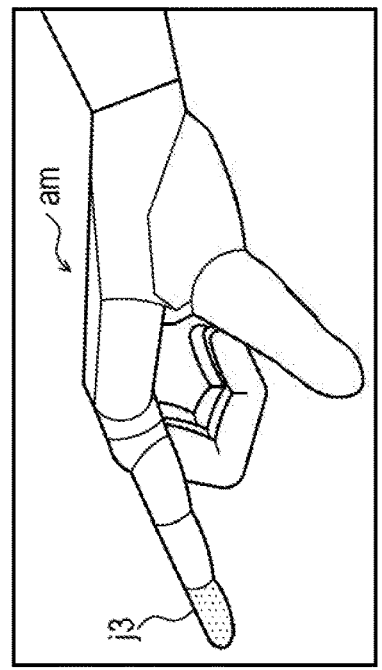

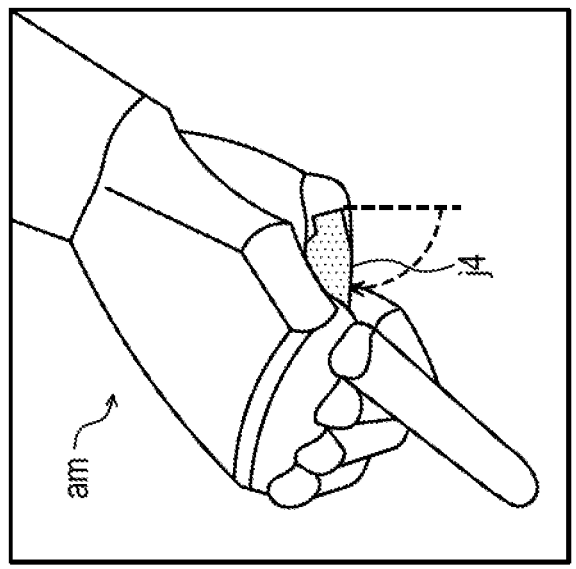
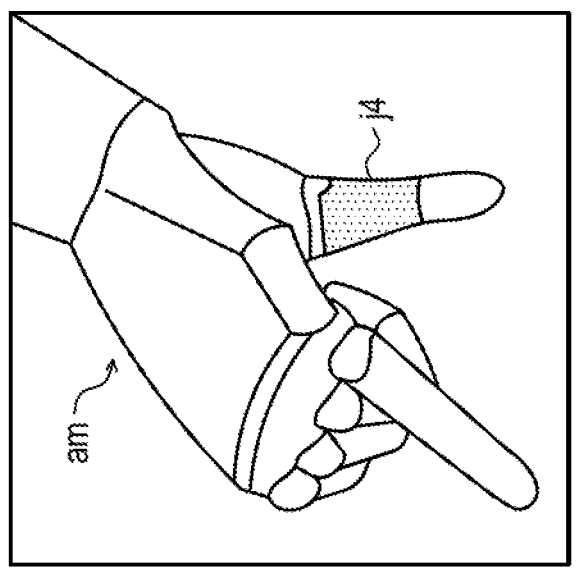
FIG.14

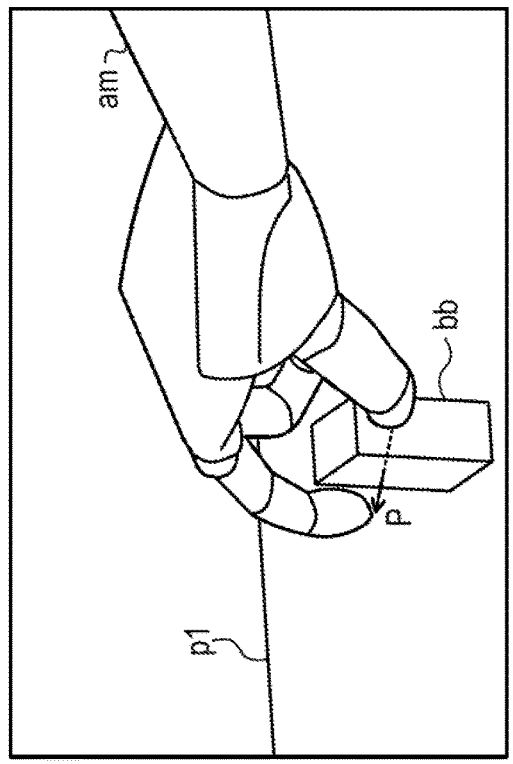
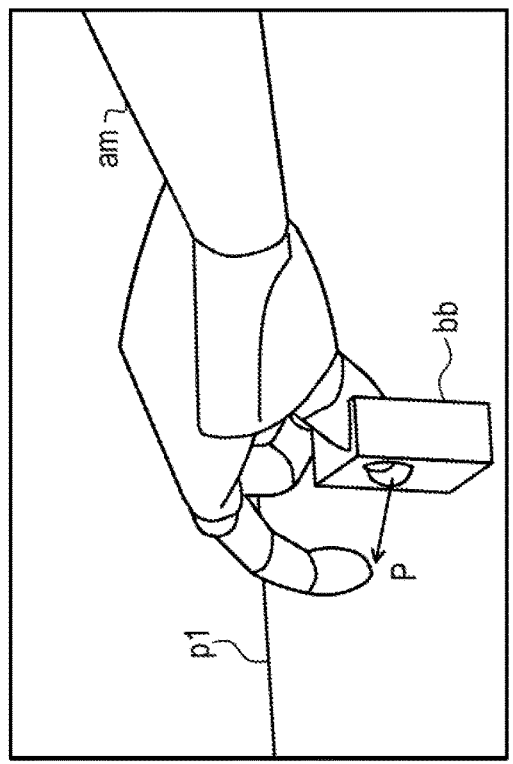
FIG.17

FINGER MODEL VERIFICATION METHOD AND INFORMATION PROCESSING APPARATUS

CROSS-REFERENCE TO RELATED APPLICATION

This application is based upon and claims the benefit of priority of the prior Japanese Patent Application No. 2015-127866 filed on Jun. 25, 2015, the entire contents of which are incorporated herein by reference.

FIELD

The embodiment discussed herein is related to a finger model verification method and an information processing apparatus

BACKGROUND

A technology for reproducing, for example, a human body or an object in a three-dimensional (3D) simulation space has conventionally been known. A technology of operating the human body or object simulated in the simulation space by an input device such as, for example, a mouse has also been known. Therefore, a work on the object performed by the human body may be simulated in the simulation space. For example, a technique of performing a verification of a work sequence such as, for example, an assembly or disassembly of an object in the simulation space has been known.

Also, a technique of generating a gripping pattern of a part by a robot hand has conventionally been known.

Also, in a conventional gripping process of a 3D model, a technique of emitting a ray or firing a bullet from a gripping tool has been known, in which, when the ray or the bullet collides with a 3D model, the 3D model is selected as a gripping target model.

Related techniques are disclosed in, for example, Japanese Laid-Open Patent Publication No. 2014-240106, Japanese Laid-Open Patent Publication No. 2009-172685, and Japanese Laid-Open Patent Publication No. 2001-325611.

However, it has conventionally been difficult to reproduce, in a simulation space, a state where an arm is actually stretched out to take a part. For example, when the reproduction is made by a mouse operation, the reproduction requires a time since the simulation space is a 3D space but the mouse operation is a planar operation. Further, for example, when a lot of joints are present, it takes time to perform, for example, a work of setting a joint value of each joint.

SUMMARY

According to an aspect of the present invention, provided is an information processing apparatus including a processor. The processor is configured to generate, in a simulation space, a rectangular parallelepiped surrounding a target part among a plurality of parts simulated in the simulation space. The target part is taken by a human body simulated in the simulation space. The rectangular parallelepiped has surfaces in contact with a maximum outer shape of the target part. The processor is configured to identify, among the surfaces of the generated rectangular parallelepiped, surfaces other than a surface in contact with a first part different from the target part. The first part is among the plurality of parts. The processor is configured to select combinations of two surfaces among the identified surfaces. The processor is configured to identify, among the selected combinations, a combination which satisfies a condition that a vector from a point of a first finger of two fingers to a point of a second finger of the two fingers penetrates the rectangular parallelepiped when the two surfaces in the combination are taken by the two fingers. The two fingers are included in the human body.

The object and advantages of the invention will be realized and attained by means of the elements and combinations particularly pointed out in the claims. It is to be understood that both the foregoing general description and the following detailed description are exemplary and explanatory and are not restirctive of the invention, as claimed.

BRIEF DESCRIPTION OF DRAWINGS

FIG. 7 is a diagram illustrating an example of object information;

FIG. 10 is a diagram illustrating an example of arm model information;

FIG. 11 is a diagram illustrating an example of a joint j1;

FIG. 12 is a diagram illustrating an example of a joint j2;

FIG. 13 is a diagram illustrating an example of a joint j3;

FIG. 14 is a diagram illustrating an example of a joint j4;

FIG. 17 is a first diagram illustrating an example of determining target surfaces;

DESCRIPTION OF EMBODIMENT

Hereinafter, an embodiment of a finger model verification method and an information processing apparatus according to the present disclosure will be described in detail with reference to accompanying drawings.

Figure 1:
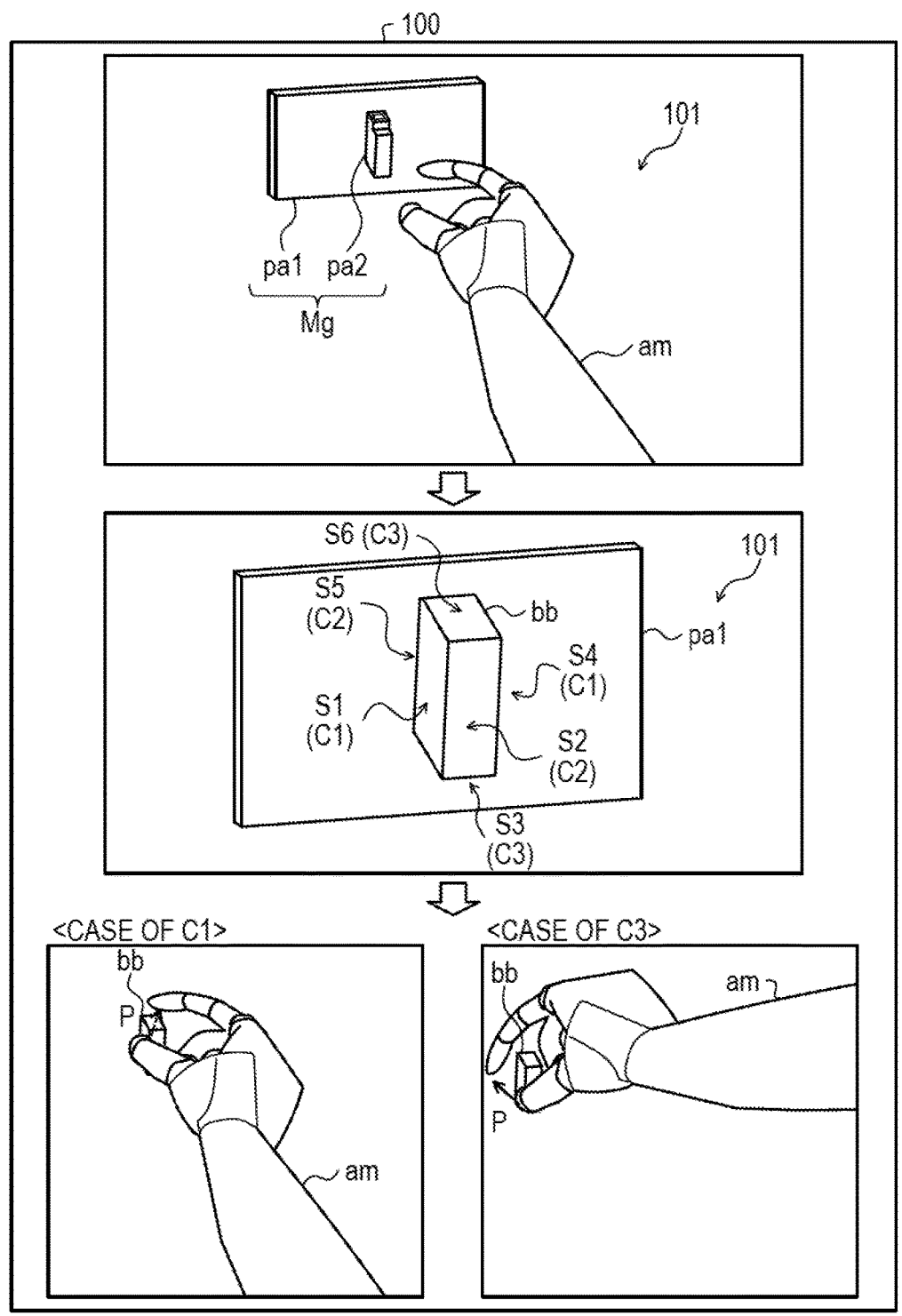
FIG. 1 is a diagram illustrating an example of an operation performed by an information processing apparatus according to an embodiment.

FIG. 1 is a diagram illustrating an example of an operation performed by an information processing apparatus according to the embodiment. An information processing apparatus 100 is a computer that verifies a work sequence on an object Mg. The information processing apparatus 100 is a computer that executes a 3D computer aided design (CAD). The information processing apparatus 100 is a computer that implements a finger model verification method by executing a finger model verification program.

A simulation space 101 is a virtual 3D space that is simulated on a computer. Specifically, for example, the simulation space 101 is a space virtually set within the information processing apparatus 100 by the 3D CAD for designing a 3D object Mg or verifying the work sequence on the object Mg. In the simulation space 101, for example, a 3D orthogonal coordinate system having an X-axis, a Y-axis, and a Z-axis is defined. The object Mg is, for example, a product, but is not particularly limited.

As described above, it has conventionally been possible to reproduce, for example, a human body or an object Mg in the 3D simulation space 101. Further, the human body or object simulated in the simulation space 101 may be operated by an input device such as a mouse. Therefore, in the simulation space 101, a work on the object Mg performed by the human body may be simulated. For example, in a manufacturing industry, a work such as assembly or disassembly of a product by the human body may be simulated, and thus, a verification of a work sequence may be performed in the simulation space 101. For example, in the simulation space, whether or not an arm or a finger interferes with a product or whether or not an operating region of the arm or the finger is properly secured may be verified. Here, each of a product, parts, a human body, and human body parts simulated in the simulation space 101 is also referred to as a model.

In the present embodiment, a human body part having a combination of an arm, the back of a hand, and fingers which are simulated in the simulation space 101 is set as an arm am. It is difficult to verify an operation of the arm am that takes a part included in the object Mg, through various patterns such as, for example, an approach direction of the arm am or a state of each joint. The approach direction of the arm am is a direction in which the arm am advances in order to take the part included in the object Mg. The taking operation may be, for example, a grabbing operation, a pick-up operation, or a gripping operation. Specifically, for example, as in a case where an arm is actually stretched out to grab or pick up a part, in reproducing a state where a posture of the arm am or each joint included in the arm am is not largely changed when the arm am is directed to a target part, there is a problem that it takes a relatively long time. In the present embodiment, a state where a posture of the arm am or each joint included in the arm am is not largely changed is also referred to as a natural state.

Figure 2:
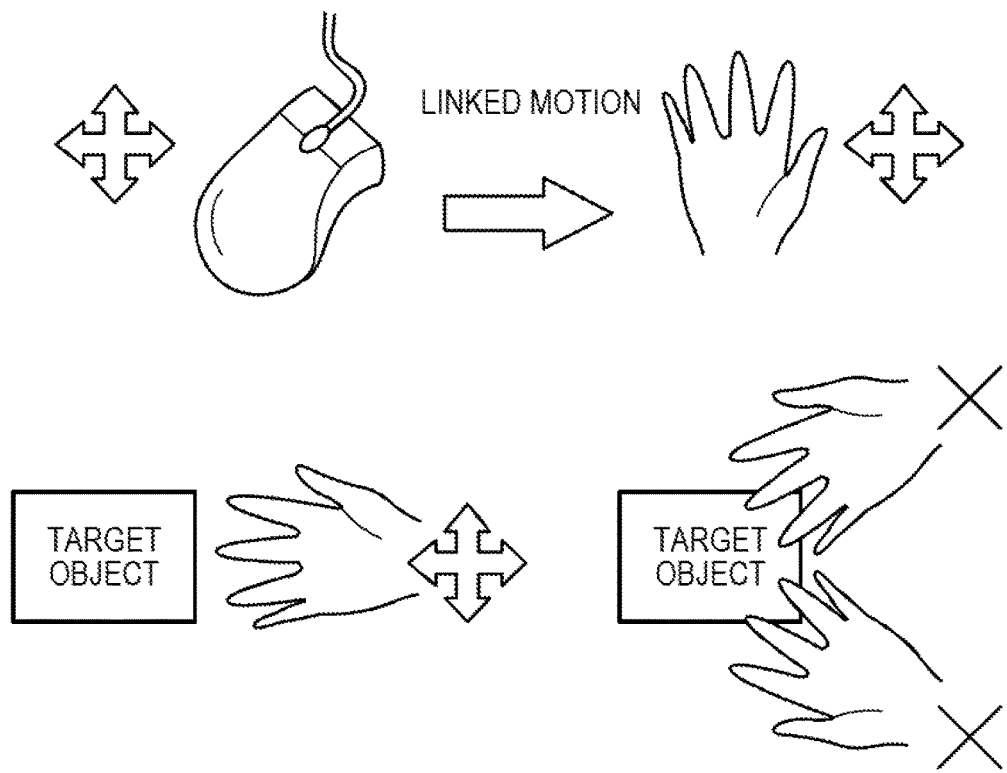
FIG. 2 is a diagram illustrating an example of a motion linked with a mouse operation.

For example, when the operation is performed through a mouse, since the mouse operation is a planar motion as illustrated in FIG. 2 to be described below, it is difficult to cause the arm am to come close to a part or to intuitively operate each joint in the 3D simulation space 101. Also, there has been a 3D input device capable of directly reproducing an operation in the simulation space 101, but there is a problem in that the input device is complicated to operate or is expensive, and thus is impractical.

In the present embodiment, the information processing apparatus 100 identifies a combination of surfaces which satisfies a condition that a vector between two fingers penetrates a rectangular parallelepiped serving as a target part in the simulation space 101, among combinations of surfaces of the rectangular parallelepiped not in contact with another part. This makes it possible to verify whether a target part is taken in a natural state only by a simple operation of an input device.

First, in the simulation space 101, the information processing apparatus 100 generates a rectangular parallelepiped that surrounds a target part among a plurality of parts simulated in the simulation space 101 and has respective surfaces in contact with a maximum outer shape of the target part. In the example of FIG. 1, the object Mg includes a part pa1 and a part pa2. The target part is, for example, the part pa2. The rectangular parallelepiped has six surfaces. The rectangular parallelepiped is obtained by framing the target part, as a simplified model of the target part. Each of the six surfaces of the rectangular parallelepiped is in contact with the maximum outer shape of the target part. The rectangular parallelepiped is also referred to as a "bounding box". The bounding box bb has surfaces S1 to S6. Each of the surfaces S1 to S6 is in contact with the maximum outer shape of the target part. The combinations of opposing surfaces in the bounding box bb are combinations C1 to C3. Based on part information by which a position, a shape, or the like of a part may be identified, for example, the information processing apparatus 100 may arrange a plurality of parts included in the object Mg in the simulation space 101.

The information processing apparatus 100 generates, for example, rectangular parallelepiped information including information such as vertices of six surfaces included in the bounding box bb. Based on the generated rectangular parallelepiped information, the information processing apparatus 100 arranges the bounding box bb in the simulation space 101.

Then, the information processing apparatus 100 identifies surfaces other than a surface in contact with a part different from the target part among a plurality of parts, among the surfaces of the bounding box bb. Since the surface S5 is in contact with the part pa1, the information processing apparatus 100 identifies surfaces other than the surface S5 among the surfaces S1 to S6. The information processing apparatus 100 may also exclude the surface S2 opposite to the surface S5 from the identified surfaces.

Among the combinations of the identified surfaces, the information processing apparatus 100 identifies a combination which satisfies a condition that a vector from a point of a first finger to a point of a second finger of two fingers included in the human body penetrates the rectangular parallelepiped when the two fingers take two surfaces of the combination. In the example of FIG. 1, the combination of identified surfaces is a combination of opposing surfaces among identified surfaces. The combination of identified surfaces is a combination candidate of target surfaces taken by the two fingers. Here, the target surfaces taken by the two fingers may also be simply referred to as target surfaces. In the example of FIG. 1, the combination candidates are a combination C1 of the surfaces S1 and S4, and a combination C3 of the surfaces S3 and S6.

The two fingers are fingers of the hand included in the modeled human body. The first finger is, for example, a thumb. This makes it possible to perform a verification using a finger that is highly likely to be used to take a target part. The point of the first finger is, for example, a center point of a belly of the thumb. The second finger is, for example, a forefinger. The point of the second finger is, for example, a center point of a belly of the forefinger.

The information processing apparatus 100 derives, for example, a vector P from the point of the first finger to the point of the second finger in a case where the point of the first finger is placed at the center of one surface of a combination candidate. For example, in the combination C1, one surface is the surface S1, and in the combination C3, one surface is the surface S3. In the example of FIG. 1, the information processing apparatus 100 derives a vector P in a case where the point of the thumb is placed at the surface S1 of the combination C1. In the example of FIG. 1, the information processing apparatus 100 derives a vector P in a case where the point of the thumb is placed at the surface S3 of the combination C3.

The one surface may be, for example, any surface visible when viewed from the approach direction of the arm am, among the surfaces of the combination candidates. This makes it possible to verify the state where the target part is taken by the arm am without a change of, for example, the direction of the arm am. When the one surface is a visible surface, for example, in the combination C1, the one surface is the surface S1, and in the combination C3, the one surface is the surface S6.

In order to take the object Mg in a natural state by two fingers, that is, the thumb and a finger other than the thumb, the placement of the thumb is dominant. Therefore, the information processing apparatus 100 may determine target surfaces by positioning the thumb, and thus, may reproduce a taking of a part in a more natural state.

The information processing apparatus 100 identifies a combination which satisfies a condition that the derived vector P penetrates the bounding box bb as a combination of the target surfaces, among the combination candidates. In the example of FIG. 1, the information processing apparatus 100 identifies the combination C1 as a combination of two target surfaces by which the target part is taken.

Thus, by the bounding box bb, it is possible to simply determine whether or not it is possible to take a target part by two fingers. Thus, without a substantial change in the present state of the arm and fingers in the simulation space, it is possible to identify surfaces by which the target part may be taken, as target surfaces. This makes it possible to verify whether the target part is taken by two fingers in a more natural state.

FIG. 2 is a diagram illustrating an example of a motion linked with a mouse operation. For example, a user moves an arm to a target part in the simulation space 101 by a mouse operation so as to reproduce an operation of taking the target part by the arm. However, the mouse only moves on a plane, and thus may reproduce only an operation of taking a part in a predetermined direction when an arm comes close to the part. More specifically, a relative position of the arm with respect to the target part may be changed by a mouse operation, but it is difficult to change the relative posture of the arm with respect to the target part.

Also, because an arm or a finger has many joints, there is a problem in that it takes a long time to manipulate a joint value of each joint and to verify an operation of grabbing or picking up each part in a variety of patterns such as various joint values or arm approach directions.

Figure 3:
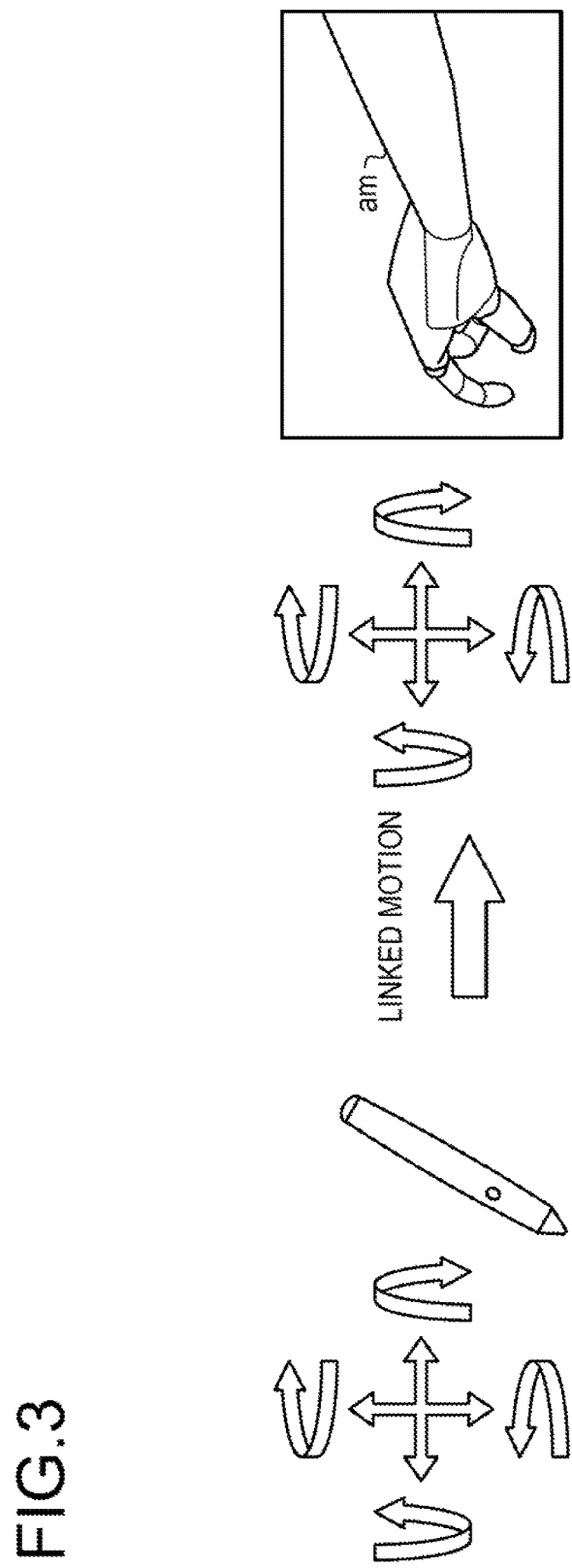
FIG. 3 is a diagram illustrating an example of a motion linked with a 3D input device.

FIG. 3 is a diagram illustrating an example of a motion linked with a 3D input device. A 3D input device is capable of detecting a position or a posture of an object or a human body simulated in the 3D simulation space 101.

Figure 4:
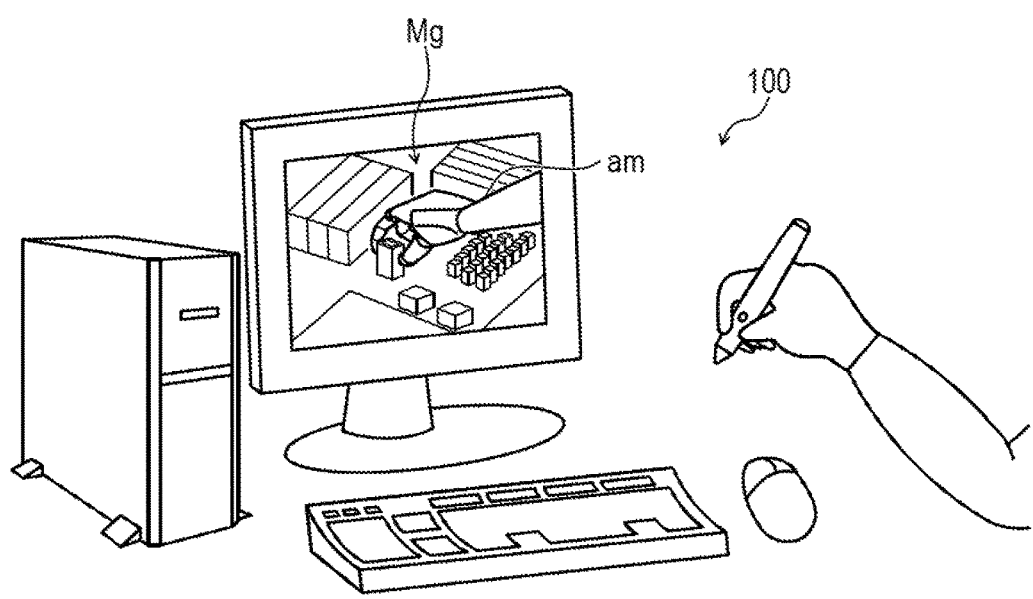
FIG. 4 is a diagram illustrating an example of an information processing apparatus.

FIG. 4 is a diagram illustrating an example of an information processing apparatus. In the present embodiment, a user operates an arm am simulated in the simulation space 101 displayed on a display, by a 3D input device, thereby verifying a work by the arm am for the object Mg simulated in the simulation space 101.

Figure 5:
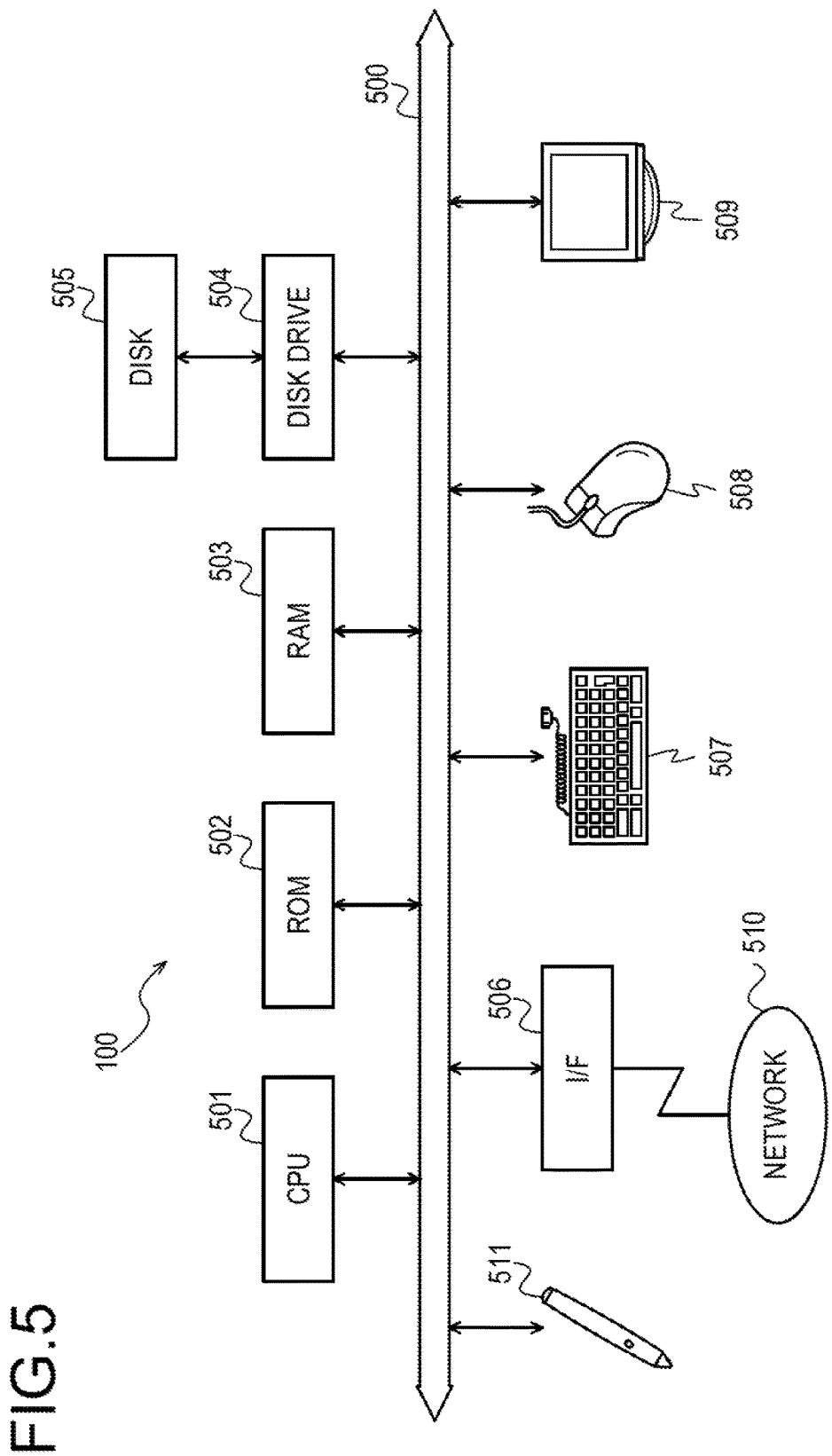
FIG. 5 is a diagram illustrating an exemplary hardware configuration of the information processing apparatus.

FIG. 5 is a diagram illustrating an exemplary hardware configuration of the information processing apparatus. The information processing apparatus 100 includes a central processing unit (CPU) 501, a read-only memory (ROM) 502, and a random access memory (RAM) 503. The information processing apparatus 100 includes a disk drive 504, a disk 505, an interface (I/F) 506, a keyboard 507, a mouse 508, a display 509, and a 3D input device 511. The CPU 501, the ROM 502, the RAM 503, the disk drive 504, the I/F 506, the keyboard 507, the mouse 508, and the display 509 are connected through a bus 500.

The CPU 501 controls the entire information processing apparatus 100. The ROM 502 stores therein a program such as a boot program. The RAM 503 is used as a work area of the CPU 501. The disk drive 504 controls reading and writing of data from/to the disk 505 under the control of the CPU 501. The disk 505 stores therein data written under the control of the disk drive 504. As the disk 505, for example, a magnetic disk, or an optical disk may be exemplified.

The I/F 506 is connected to a network 510 such as, for example, a local area network (LAN), a wide area network (WAN), or the Internet through a communication line and is connected to another device through the network 510. The I/F 506 is in charge of an interface between the inside and the network 510 to control input and output of data from and to an external device. For example, a modem or a LAN adapter may be employed as the I/F 506.

The keyboard 507 and the mouse 508 are interfaces through which various data are input by a user operation. The display 509 is an interface through which data are output in accordance with an instruction of the CPU 501.

The 3D input device 511 is an interface through which various data are input by a user operation. The operation of the 3D input device 511 is linked with the position and posture of the arm am in the simulation space 101. Accordingly, as illustrated in FIG. 3, it becomes possible to change the position and posture of the arm am in response to a change in the direction of the 3D input device 511 caused by the user operation.

Although not illustrated, an input device for taking images or videos from a camera, or an input device for taking voices from a microphone may be provided in the information processing apparatus 100. Also, although not illustrated, an output device such as a printer may be provided in the information processing apparatus 100.

In the present embodiment, as a hardware configuration of the information processing apparatus 100, a personal computer is exemplified, but the hardware configuration is not limited thereto. For example, a server may be employed. When the information processing apparatus 100 is a server, for example, a user operable device and the display 509 may be connected with the information processing apparatus 100 via the network 510.

Figure 6:
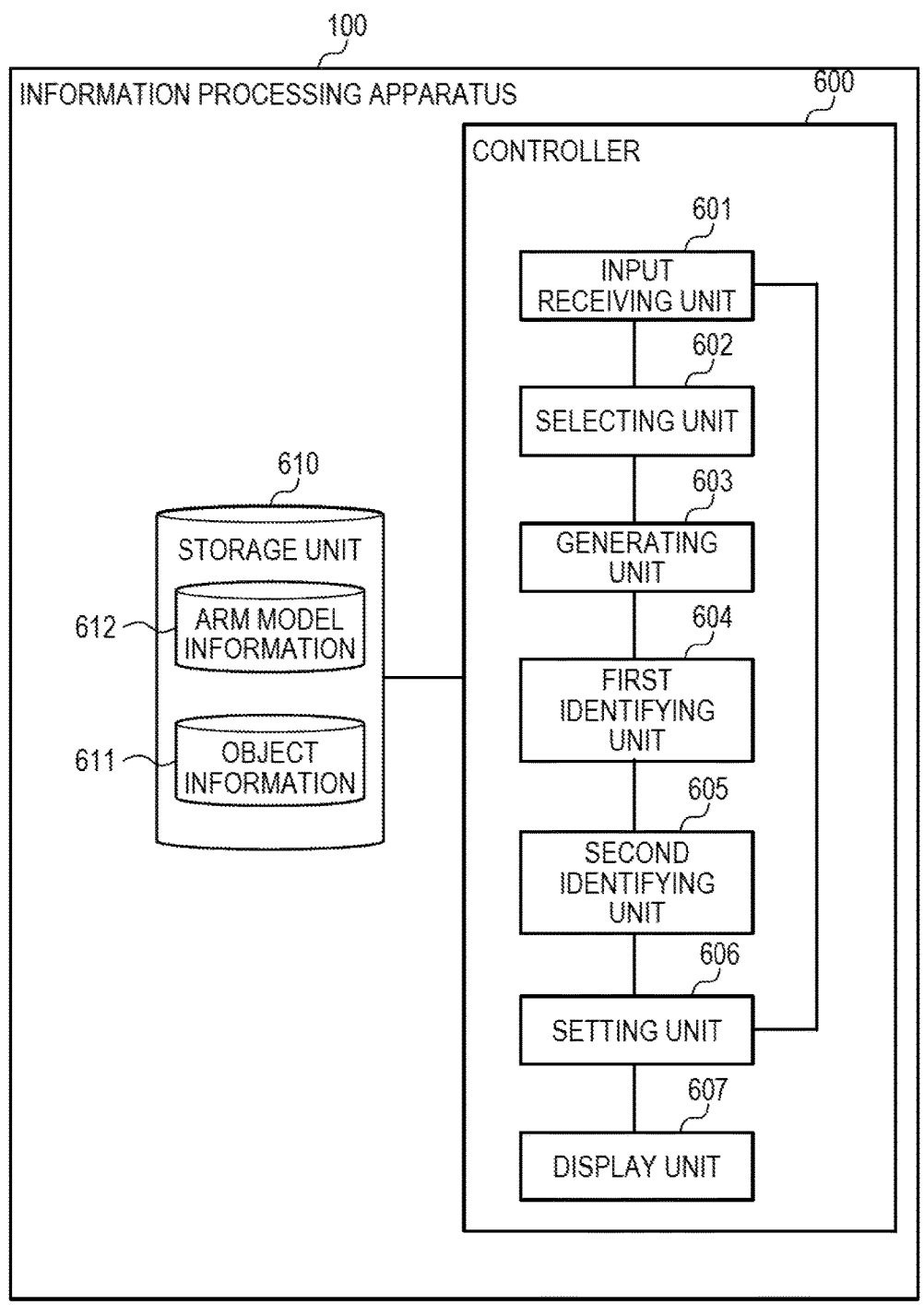
FIG. 6 is a diagram illustrating an exemplary functional configuration of the information processing apparatus.

FIG. 6 is a diagram illustrating an exemplary functional configuration of the information processing apparatus. The information processing apparatus 100 includes a controller 600 and a storage unit 610. The controller 600 includes an input receiving unit 601, a selecting unit 602, a generating unit 603, a first identifying unit 604, a second identifying unit 605, a setting unit 606, and a display unit 607. The processing contents (the input receiving unit 601 to the display unit 607) of a controller 600 are coded into a program stored in the storage unit 610 such as, for example, the ROM 502, the RAM 503, and the disk 505 illustrated in FIG. 5 which are accessible by the CPU 501. Then, the CPU 501 reads out the program from the storage unit 610 and executes the program. Thus, the processing of the controller 600 is implemented. Further, the processing result of the controller 600 is stored in the storage unit 610 such as, for example, the RAM 503, the ROM 502, or the disk 505. The controller 600 may store the information acquired through the network 510 in the storage unit 610. The information processing apparatus 100 executes a 3D CAD.

Figure 8:
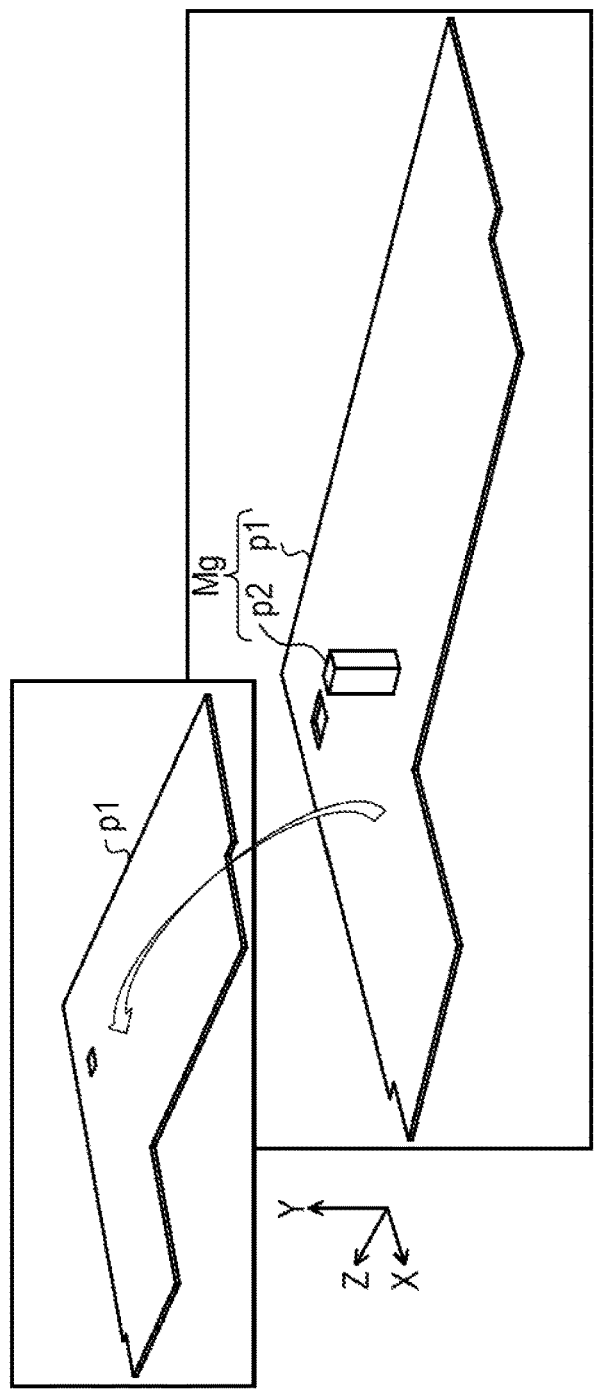
FIG. 8 is a diagram illustrating an example of a part.
Figure 9:
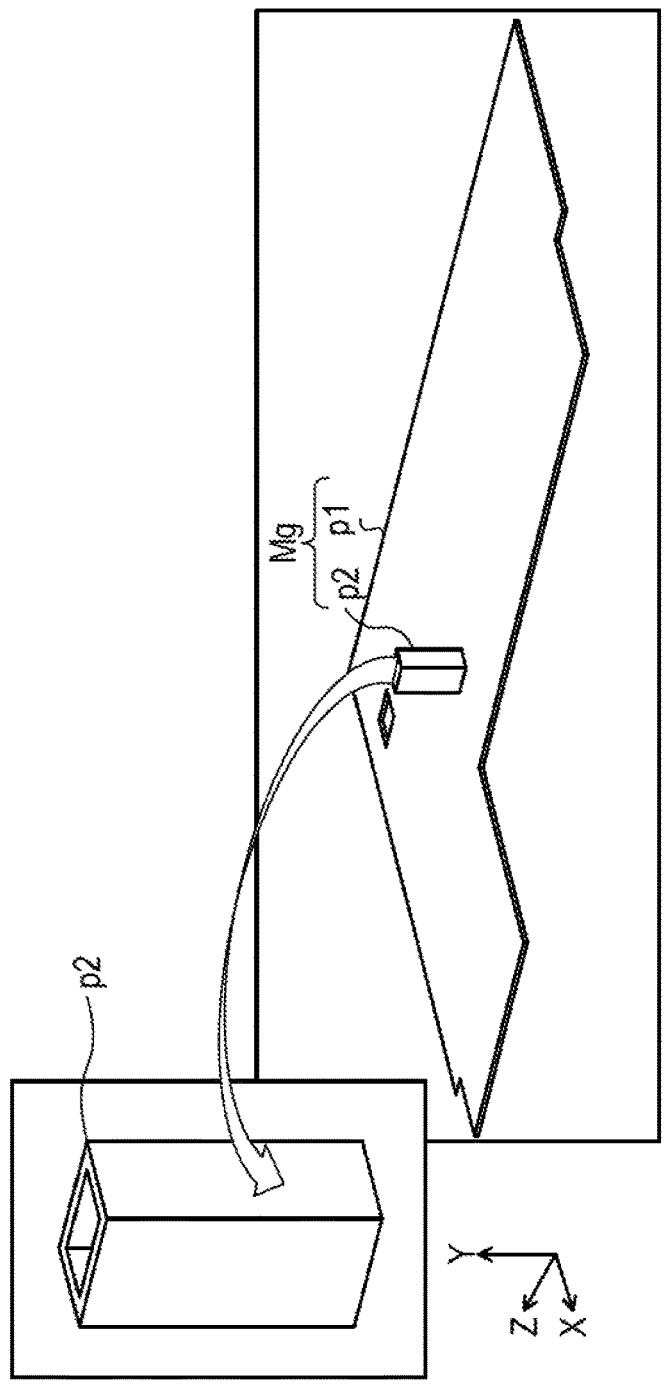
FIG. 9 is a diagram illustrating an example of a part.

The storage unit 610 stores therein, for example, object information 611, and arm model information 612. The object information 611 is information about each of a plurality of parts included in the object Mg simulated in the simulation space 101. Simple examples of the object information 611 and parts are illustrated in FIGS. 7 to 9. The arm model information 612 is information on the position or posture of the arm am simulated in the simulation space 101, and each of joints included in the arm. Simple examples of the arm model information 612 and joints are illustrated in FIGS. 10 to 14.

FIG. 7 is a diagram illustrating an example of object information. The object information 611 includes, for example, the position and dimension of each of the plurality of parts included in the object Mg arranged in the simulation space 101.

The object information 611 includes, for example, fields of "part", "minimum value", and "dimension". The part information (e.g., part information 701-1, 701-2, etc.) is stored by setting information in each field.

In the field of "part", identification information by which a part is uniquely identified is set. In the field of "minimum value", the position of the part in the simulation space 101, that is, the minimum coordinate value in each axis is set. In the field of "dimension", a distance from the minimum value relative to the positive direction of each coordinate axis is set.

FIGS. 8 and 9 are diagrams illustrating examples of a part. As illustrated in FIGS. 8 and 9, the object Mg simulated in the simulation space 101 includes a part p1 and a part p2.

The part p1 illustrated in FIG. 8 has, for example, minimum values of "−204", "9.6", and "−143" in the order of X, Y, and Z, according to the part information 701-1 illustrated in FIG. 7. The part p1 illustrated in FIG. 8 has, for example, dimensions of "408", "3.1", and "508" in the order of X, Y, and Z, according to the part information 701-1 illustrated in FIG. 7. The unit of the dimension is "mm".

The part p2 illustrated in FIG. 9 has, for example, minimum values of "−15.0", "9.6", and "−303.0" in the order of X, Y, and Z, according to the part information 701-2 illustrated in FIG. 7. The part p2 illustrated in FIG. 9 has, for example, dimensions of "15.5", "51.7", and "23.0" in the order of X, Y, and Z, according to the part information 701-2 illustrated in FIG. 7.

FIG. 10 is a diagram illustrating an example of arm model information. The arm model information 612 includes, for example, fields of "arm", "posture", "position", "joint", "minimum value of joint value", "maximum value of joint value", and "setting value of joint value". The joint information (e.g., joint information 1001-1, etc.) is stored by setting information in each field. The values set in the fields of "arm", "position", and "posture" are common in the joint information 1001. Further, although not illustrated, the arm model information 612 has information on each size of the arm am. The model size of the arm am is determined by, for example, an average of adult arms am.

In the field of "arm", identification information by which an arm am is uniquely identified is set. In the field of "posture", degrees of rotation in the X, Y, and Z axes defined in the model of the arm am with respect to the X, Y, and Z axes defined in the simulation space 101 are set. The unit of the value set in the posture is "degree". In the field of "position", coordinate values indicating the position of the center of gravity, such as an elbow of the arm am, in the X, Y, and Z axes defined in the simulation space 101 are set. A coordinate system defined in the simulation space 101 is a global coordinate system, and a coordinate system defined in the model of the arm am is a local coordinate system. When a change of a position or posture is input by, for example, the 3D input device 511, the values of the field of "posture" or "position" are changed.

In the field of "joint", identification information by which a joint is uniquely identified is set. In the field of "minimum value", a minimum value of a joint value is set. The unit of the joint value is "degree". In the field of "maximum value", a maximum value of a joint value is set. In the field of "setting value", the joint value of the arm am model to be displayed is set.

FIG. 11 is a diagram illustrating an example of a joint j1. The joint j1 illustrated in FIG. 11 is a third joint of a forefinger. The left side of FIG. 11 illustrates an example in which the joint value of the joint j1 is a minimum value, and the right side of FIG. 11 illustrates an example in which the joint value of the joint j1 is a maximum value. According to the joint information 1001-1 illustrated in FIG. 10, the minimum value of the joint value of the joint j1 is "0", and the maximum value of the joint value of the joint j1 is "60".

FIG. 12 is a diagram illustrating an example of a joint j2. The joint j2 illustrated in FIG. 12 is a second joint of a forefinger. The left side of FIG. 12 illustrates an example in which the joint value of the joint j2 is a minimum value, and the right side of FIG. 12 illustrates an example in which the joint value of the joint j2 is a maximum value. According to the joint information 1001-2 illustrated in FIG. 10, the minimum value of the joint value of the joint j2 is "0", and the maximum value of the joint value of the joint j2 is "90".

FIG. 13 is a diagram illustrating an example of a joint j3. The joint j3 illustrated in FIG. 13 is a first joint of a forefinger. The left side of FIG. 13 illustrates an example in which the joint value of the joint j3 is a minimum value, and the right side of FIG. 13 illustrates an example in which the joint value of the joint j3 is a maximum value. According to the joint information 1001-3 illustrated in FIG. 10, the minimum value of the joint value of the joint j3 is "0", and the maximum value of the joint value of the joint j3 is "90".

FIG. 14 is a diagram illustrating an example of a joint j4. The joint j4 illustrated in FIG. 14 is a second joint of a thumb. The left side of FIG. 14 illustrates an example in which the joint value of the joint j4 is a minimum value, and the right side of FIG. 14 illustrates an example in which the joint value of the joint j4 is a maximum value. According to the joint information 1001-4 illustrated in FIG. 10, the minimum value of the joint value of the joint j4 is "0", and the maximum value of the joint value of the joint j4 is "90".

The input receiving unit 601 receives, for example, an input by an operation of the 3D input device 511. Accordingly, the input receiving unit 601 receives, for example, a change of the posture of the arm am simulated in the simulation space 101, a change of the joint value of each joint of a finger included in the arm am, and a change of the position of the arm am.

The setting unit 606 changes the arm model information 612 in response to a change input of the posture or position received by the input receiving unit 601.

First, the selecting unit 602 selects a target part to be taken by an arm am in the simulation space 101. More specifically, the selecting unit 602 selects the target part from among a plurality of parts simulated in the simulation space 101, for example, the selecting unit 602 selects a part nearest to the arm am among parts present in the approach direction of the arm am simulated in the simulation space 101.

Figure 15:
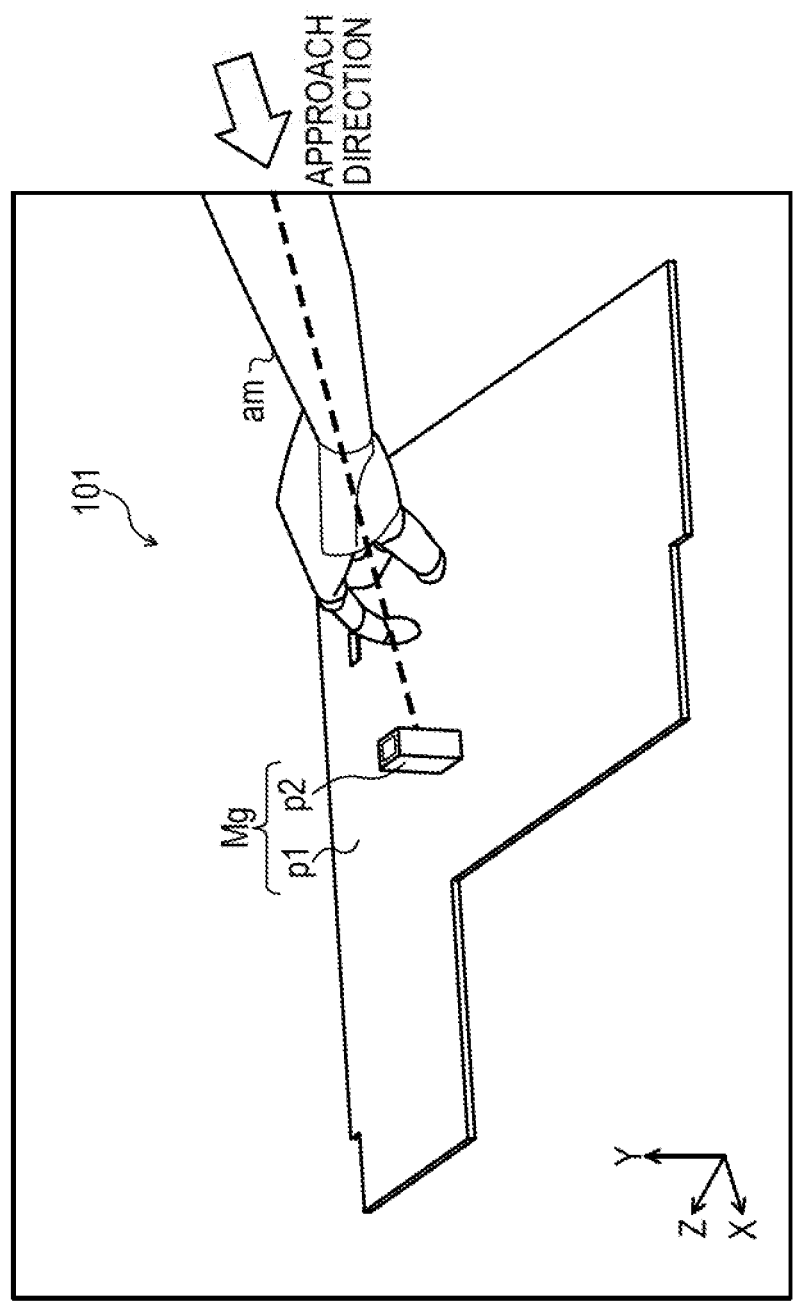
FIG. 15 is a diagram illustrating an exemplary selection of a target part.

FIG. 15 is a diagram illustrating an exemplary selection of a target part. In the example of FIG. 15, the simulated human body is a portion ranging from the arm am to fingertips.

The selecting unit 602 selects a part p2 present in the approach direction of the arm am, as a target part taken by the arm am, among the parts p1 and p2 included in the object Mg.

Then, the generating unit 603 illustrated in FIG. 6 generates a bounding box bb in the simulation space 101. The bounding box bb is a rectangular parallelepiped that surrounds a target part among a plurality of parts simulated in the simulation space 101 and has respective surfaces in contact with a maximum outer shape of the target part. Specifically, the generating unit 603 may generate, for example, a bounding box bb whose respective surfaces are in contact with the maximum outer shape of the target part according to the minimum value and the dimension of each coordinate axis included in the part information 701 of the target part included in the object information 611.

Then, the generating unit 603 generates, for example, rectangular parallelepiped information indicating the bounding box bb having respective surfaces in contact with the maximum outer shape. The rectangular parallelepiped information may be, for example, information having coordinate values of vertices for each surface included in the bounding box bb. The information processing apparatus 100 runs a 3D CAD, and thus may generate a bounding box bb indicated by the rectangular parallelepiped information in the simulation space 101 by reading out the rectangular parallelepiped information through the 3D CAD.

Among surfaces of the generated bounding box bb, the first identifying unit 604 identifies surfaces other than a surface in contact with a part different from the target part among a plurality of parts. The surface in contact with a part different from the target part may be, for example, a surface partially in contact with the part different from the target part. The surface partially in contact with another part may be, for example, a surface that is in contact at a predetermined ratio or more. The predetermined ratio may be determined, for example, based on an area of a simulated finger and a part size, or may be determined by a user.

Figure 16:
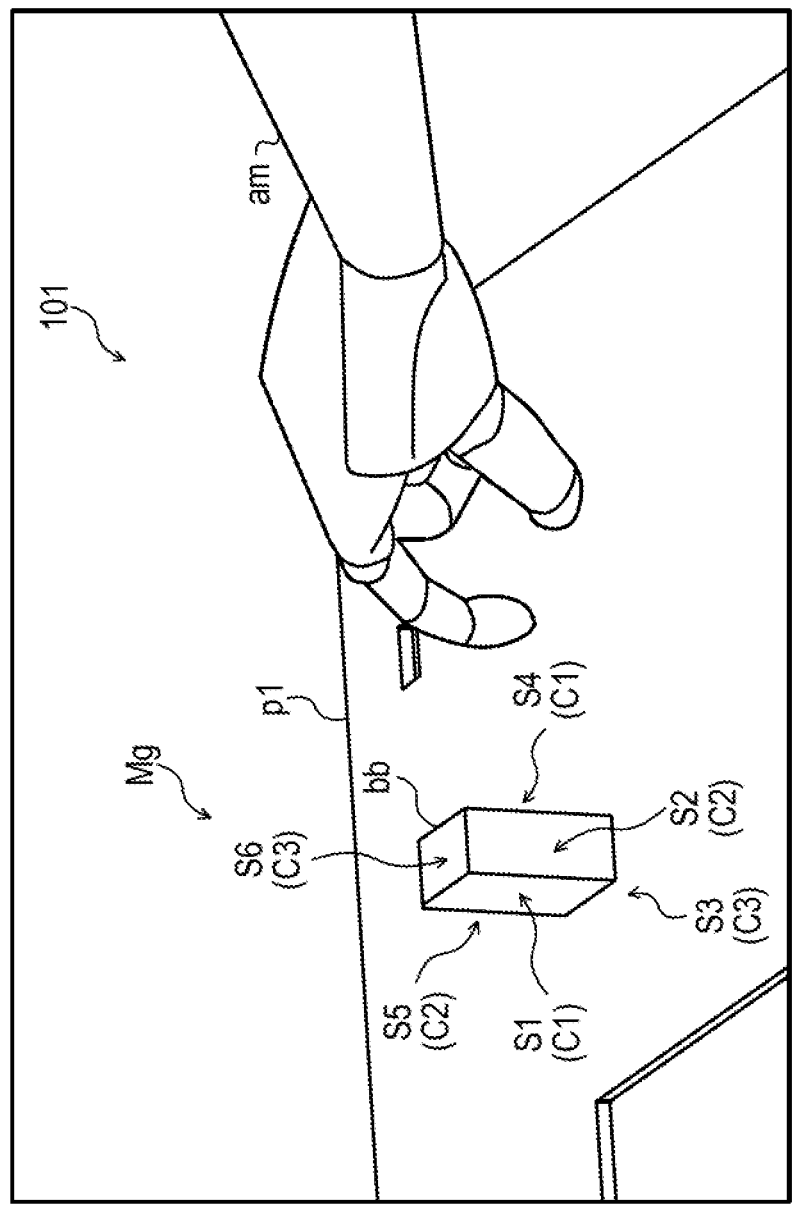
FIG. 16 is a diagram illustrating an example of a bounding box and combinations of surfaces.

FIG. 16 is a diagram illustrating an example of a bounding box and combinations of surfaces. Since a surface S3 is in contact with a part p1 different from the target part, the first identifying unit 604 identifies surfaces other than the surface S3.

Among the combinations of surfaces of the bounding box bb, combinations other than a combination in which at least one surface is in contact with another part are identified as combination candidates of target surfaces. This makes it possible to exclude a combination of surfaces that is unable to be taken due to the positional relationship with another part. Thus it becomes possible to reproduce a state where the part is taken more naturally by two fingers.

The combinations of surfaces are, for example, obtained through 15 ways. Even by two adjacent surfaces, depending on a material or shape of a part, the part may be taken by two fingers in a natural state. As described above, since the surface S3 is in contact with the part p1 different from the target part, the first identifying unit 604 identifies combinations other than a combination including the surface S3, as combination candidates. Here, the first identifying unit 604 identifies, for example, 10 kinds of combinations as combination candidates.

The first identifying unit 604 identifies, for example, combinations other than a combination in which one surface is in contact with another part, among combinations of opposing surfaces of the bounding box bb, as combination candidates of target surfaces. Even in a case where, for example, a target part is heavy or is made of a slippery material, the target part is highly likely to be taken more accurately by a combination of two opposing surfaces than a combination of adjacent surfaces. Thus, when the first identifying unit 604 identifies combination candidates while limiting combinations of surfaces to combinations of opposing surfaces, two target surfaces may be identified from fewer combination candidates, thereby increasing the processing speed.

In the example of FIG. 16, combinations of opposing surfaces are combinations C1 to C3. In the combination C3, the surface S3 is in contact with the part p1 different from the target part. Thus, the first identifying unit 604 excludes the combination C3 from combination candidates. Thus, the combinations C1 and C2 become combination candidates.

Whether or not to limit combinations of surfaces to combinations of opposing surfaces may be selected by a user depending on, for example, the size of the object Mg, or the assumed material or weight of the object Mg. Hereinafter, descriptions will be made using an example where combination candidates are limited to combinations of opposing surfaces.

The first identifying unit 604 excludes a combination candidate in which a distance between two surfaces is equal to or larger than a threshold, among the identified combination candidates. The threshold is, for example, a value set based on the length between fingertips of two fingers when the two fingers are spread. Thus, a combination of surfaces that are hard to take due to a long distance between surfaces may be excluded, and it becomes possible to reproduce a taking in a more natural state. In the example of FIG. 16, there is no combination candidate having a distance equal to or larger than the threshold.

Then, the second identifying unit 605 illustrated in FIG. 6 identifies, among the identified combination candidates of surfaces, a combination candidate which satisfies a condition that a vector from a point of a first finger to a point of a second finger of two fingers to be assumed to take surfaces of the combination candidate penetrates the rectangular parallelepiped. The two fingers are included in the human body simulated in the simulation space 101.

FIG. 17 is a first diagram illustrating an example of determining target surfaces. The second identifying unit 605 calculates a vector from the point of the first finger to the point of the second finger when the point of the first finger is placed at the center point of one surface of each combination candidate. More specifically, the second identifying unit 605 places, for example, the point of the first finger at the center of one surface. The one surface is, for example, a surface visible when viewed from the approach direction of the arm am, among two surfaces of the combination candidate. When both surfaces are visible, the second identifying unit 605 may derive a vector P for a case where the point of the first finger is placed on each surface.

Then, the second identifying unit 605 identifies a combination candidate which satisfies a condition that the calculated vector P penetrates the bounding box bb, among the combination candidates. The first finger is, for example, a thumb. The second finger is, for example, a forefinger. Thus, taking a target part by two fingers in a more natural state may be assumed.

The left side of FIG. 17 illustrates a vector P in a case where the point of the thumb is placed at one surface of the combination C1. The vector P does not penetrate the bounding box bb. The right side of FIG. 17 illustrates a vector P in a case where the point of the thumb is placed at one surface of the combination C2. The vector P penetrates the bounding box bb. Thus, in the example of FIG. 17, the second identifying unit 605 identifies two surfaces of the combination C2, as target surfaces taken by two fingers.

Figure 18:
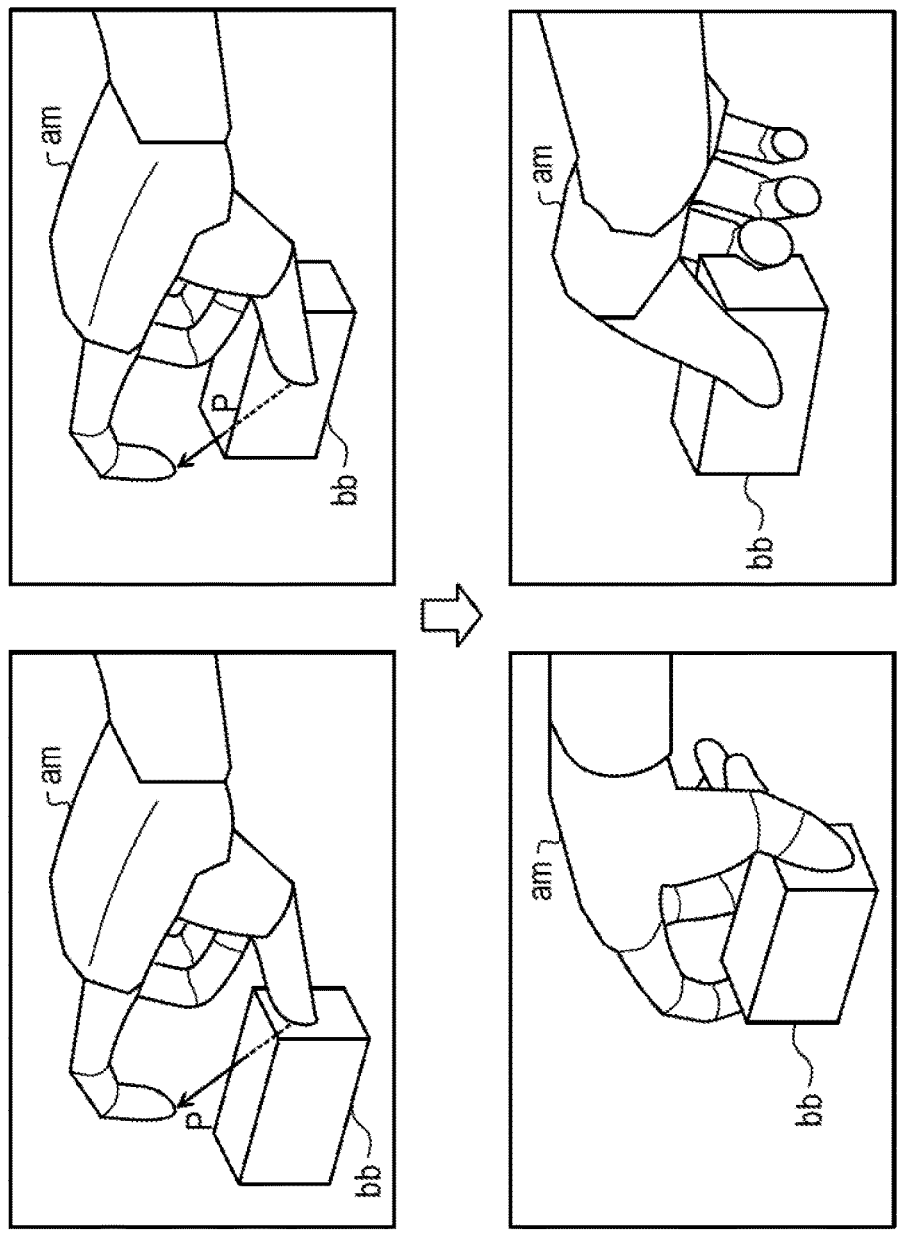
FIG. 18 is a second diagram illustrating an example of determining target surfaces.

FIG. 18 is a second diagram illustrating an example of determining target surfaces. In the example of FIG. 18, the vector P for any combination candidate penetrates the bounding box bb. In such a case, the second identifying unit 605 calculates, for each of combination candidates, a rotation amount in a case where a vector P from the point of the thumb to the point of the forefinger is rotated to a vector connecting a center point of one surface at which the thumb is placed to a center point of the other surface. The rotation amount is, for example, an angle formed between the relevant vector and the vector P. The rotation amount may be calculated by, for example, a rotation matrix, and is θ included in the rotation matrix. Then, the second identifying unit 605 identifies, among the combination candidates, a combination candidate having a smaller rotation amount, as the combination of target surfaces. As illustrated in FIG. 18, when the rotation amount is large, the amount in which the posture of the arm am is changed is increased, thereby causing an unnatural state. Thus, the second identifying unit 605 identifies a combination candidate having a smaller rotation amount as a combination of target surfaces taken by two fingers, thereby reproducing a taking of a target part in a more natural state.

The setting unit 606 calculates each joint value such that when setting the position of the thumb at a location in contact with the target part on one surface of the combination of the target surfaces, the position of the forefinger is placed at a location in contact with the target part on the other surface of the combination of the target surfaces, and sets the calculated value in the arm model information 612. The method of calculating a joint value is not particularly limited.

Figure 19:
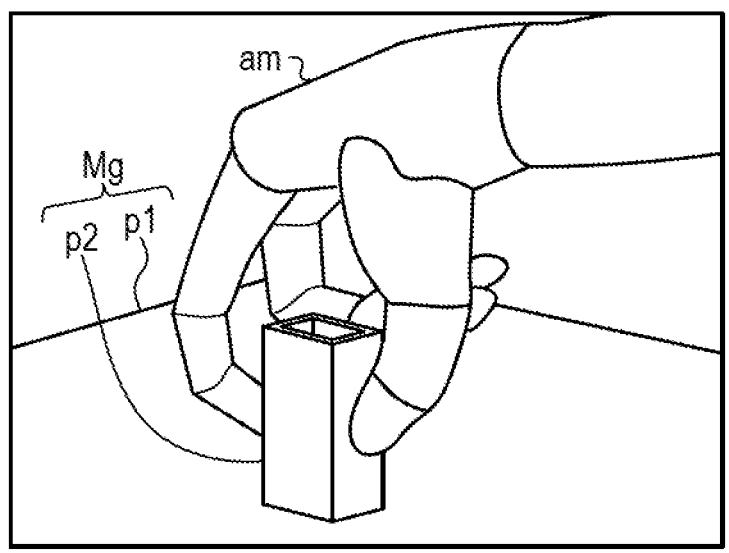
FIG. 19 is a diagram illustrating an example of taking a target part by two fingers.

FIG. 19 is a diagram illustrating an example of taking a target part by two fingers. The display unit 607 displays a state where a target part is taken by a thumb and a forefinger included in an arm am in the simulation space 101, based on the arm model information 612 set by the setting unit 606.

Accordingly, the user may check a taking state. Further, combinations of two adjacent surfaces may be included in combination candidates. When, for example, a combination of the two adjacent surfaces is identified as a combination of target surfaces, a user may check a taking state. Then, when the user wants to change the taking state, the user may perform a processing again while limiting combinations of target surfaces to combinations of opposing surfaces.

Figure 20:
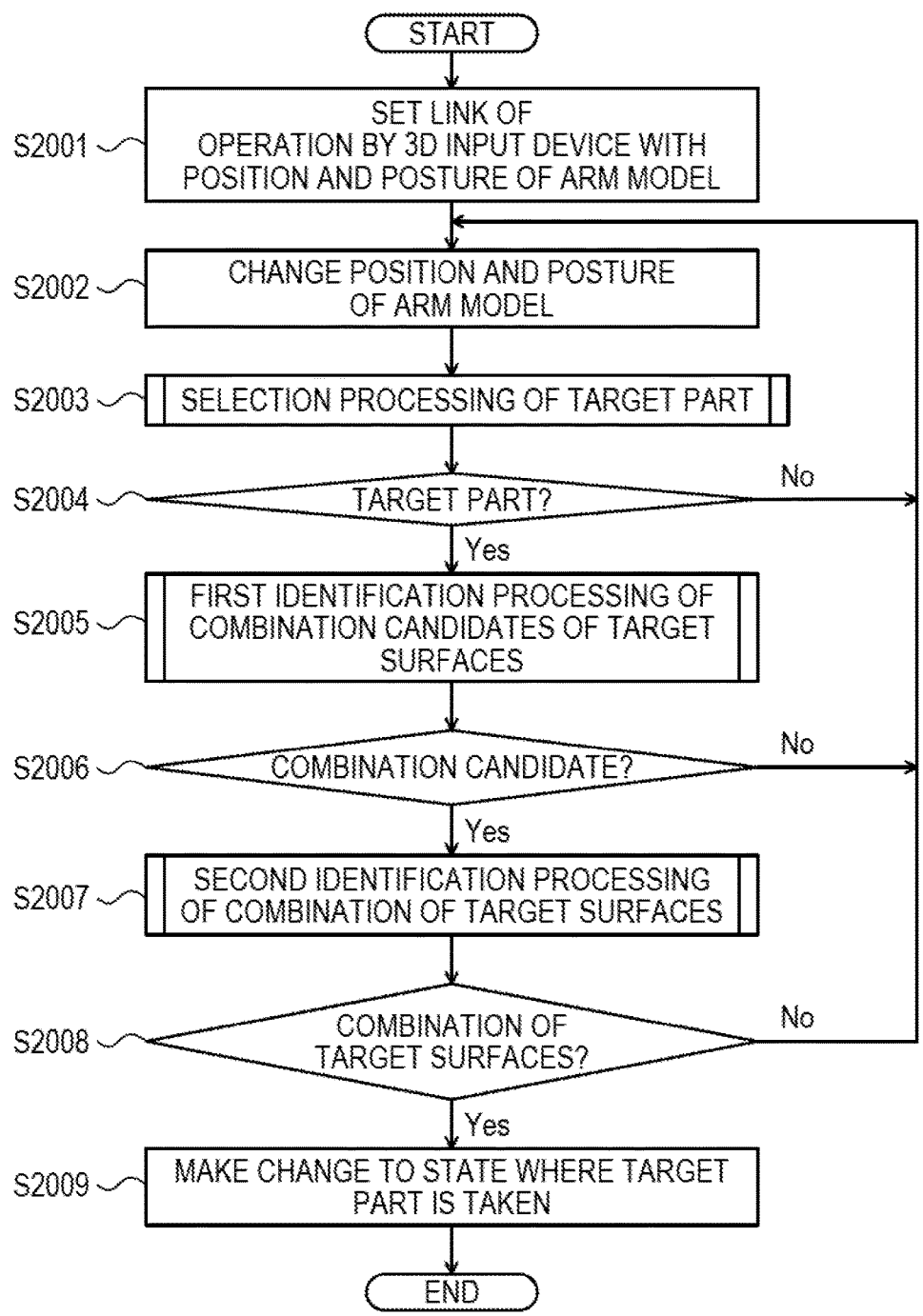
FIG. 20 is a flowchart illustrating an exemplary processing sequence performed by an information processing apparatus.

FIG. 20 is a flowchart illustrating an exemplary processing sequence performed by an information processing apparatus. First, the information processing apparatus 100 sets a link of the operation by the 3D input device 511 with the position and posture of the arm am model in the simulation space 101 (S2001). Then, the information processing apparatus 100 receives a change of the position and posture of the arm am model (S2002). In S2002, the information processing apparatus 100 receives, for example, the change of at least one of the position and posture.

Then, the information processing apparatus 100 performs selection processing of a target part to be taken by two fingers (S2003). The information processing apparatus 100 determines whether the target part is present (S2004). When it is determined that no target part is present (S2004: No), the information processing apparatus 100 returns to S2002.

When it is determined that the target part is present (S2004: Yes), the information processing apparatus 100 performs first identification processing of combination candidates of target surfaces (S2005). Then, the information processing apparatus 100 determines whether a combination candidate is present (S2006).

When it is determined that no combination candidate is present (S2006: No), the information processing apparatus 100 returns to S2002. When it is determined that a combination candidate is present (S2006: Yes), the information processing apparatus 100 performs second identification processing of a combination of target surfaces (S2007).

Then, the information processing apparatus 100 determines whether a combination of target surfaces is present (S2008). When it is determined that no combination is present (S2008: No), the information processing apparatus 100 returns to S2002. When it is determined that a combination is present (S2008: Yes), the information processing apparatus 100 performs processing of making a change to a state where the two fingers take the target part on the basis of the identified combination (S2009), and terminates the series of processing. The processing of making a change to a taking state refers to processing in which the information processing apparatus 100 derives respective joint values on the basis of the identified combination of the target surfaces and sets the values in the arm model information 612, thereby making a change to a state where the target part is taken.

Figure 21:
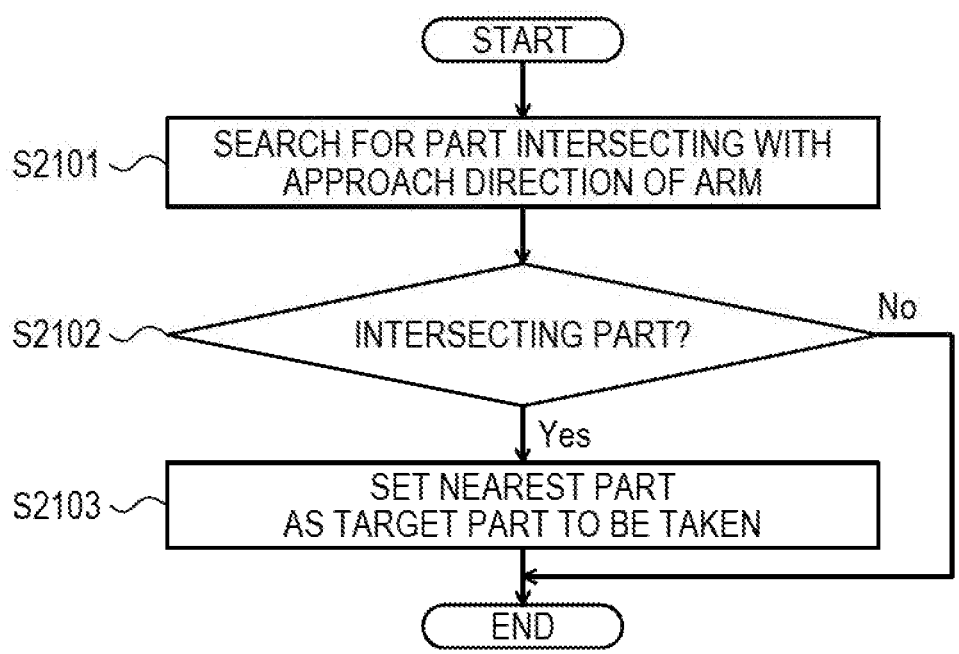
FIG. 21 is a flowchart illustrating details of the selection processing illustrated in FIG. 20.

FIG. 21 is a flowchart illustrating details of the selection processing illustrated in FIG. 20. The information processing apparatus 100 searches for a part that intersects with an approach direction of an arm am in the simulation space 101 (S2101).

Then, the information processing apparatus 100 determines whether an intersecting part is present (S2102). When it is determined that no intersecting part is present (S2102: No), the information processing apparatus 100 terminates the series of processing. When it is determined that an intersecting part is present (S2102: Yes), the information processing apparatus 100 sets, as the target part, a part nearest to the arm am among intersecting parts (S2103), and terminates the series of processing. When only one intersecting part is present, the information processing apparatus 100 may set the intersecting part as the target part without performing S2103.

Figure 22:
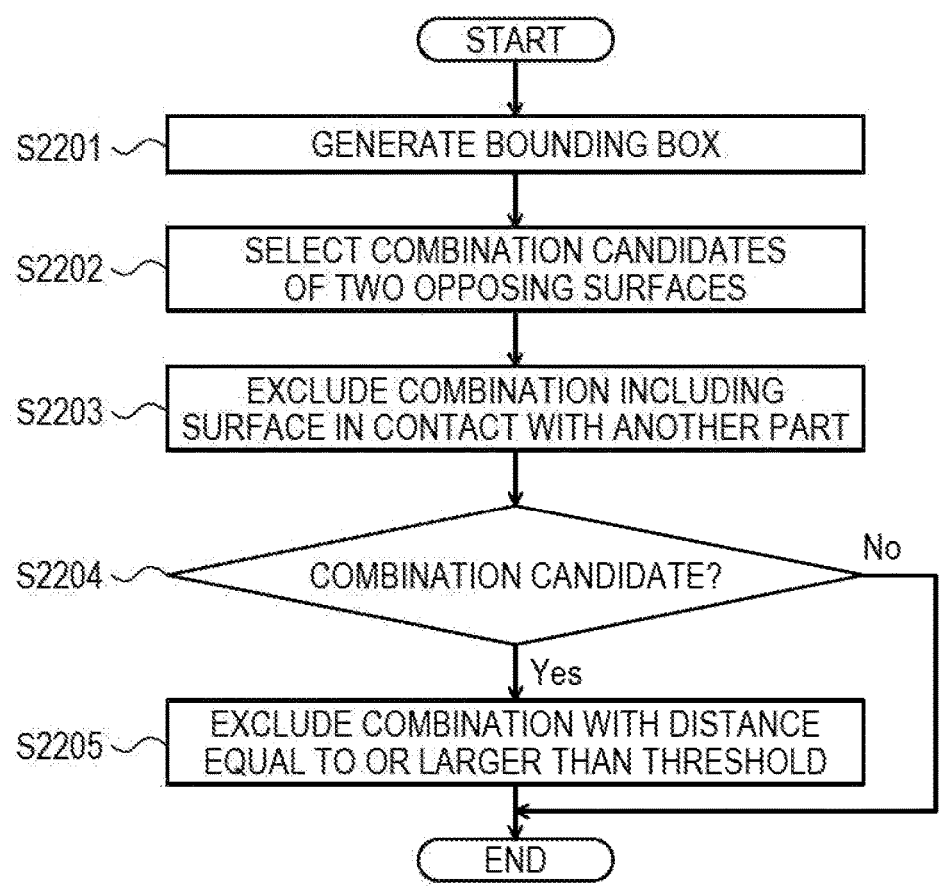
FIG. 22 is a flowchart illustrating details of the first identification processing illustrated in FIG. 20.

FIG. 22 is a flowchart illustrating details of the first identification processing illustrated in FIG. 20. The information processing apparatus 100 generates a bounding box bb that surrounds the target part and has respective surfaces in contact with a maximum outer shape of the target part, in the simulation space 101 (S2201). In S2201, when the bounding box bb is generated in the simulation space 101, rectangular parallelepiped information indicating the bounding box bb is generated.

The information processing apparatus 100 sets combinations of two opposing surfaces among the respective surfaces included in the bounding box bb, as combination candidates of two surfaces (S2202). The information processing apparatus 100 excludes a combination including a surface in contact with another part from the combination candidates (S2203). Then, the information processing apparatus 100 determines whether a combination candidate is present (S2204). When it is determined that no combination candidate is present (S2204: No), the information processing apparatus 100 terminates the series of processing.

When it is determined that a combination candidate is present (S2204: Yes), the information processing apparatus 100 excludes a combination in which a distance between two surfaces is equal to or larger than a threshold from the combination candidates (S2205), and terminates the series of processing.

Figure 23:
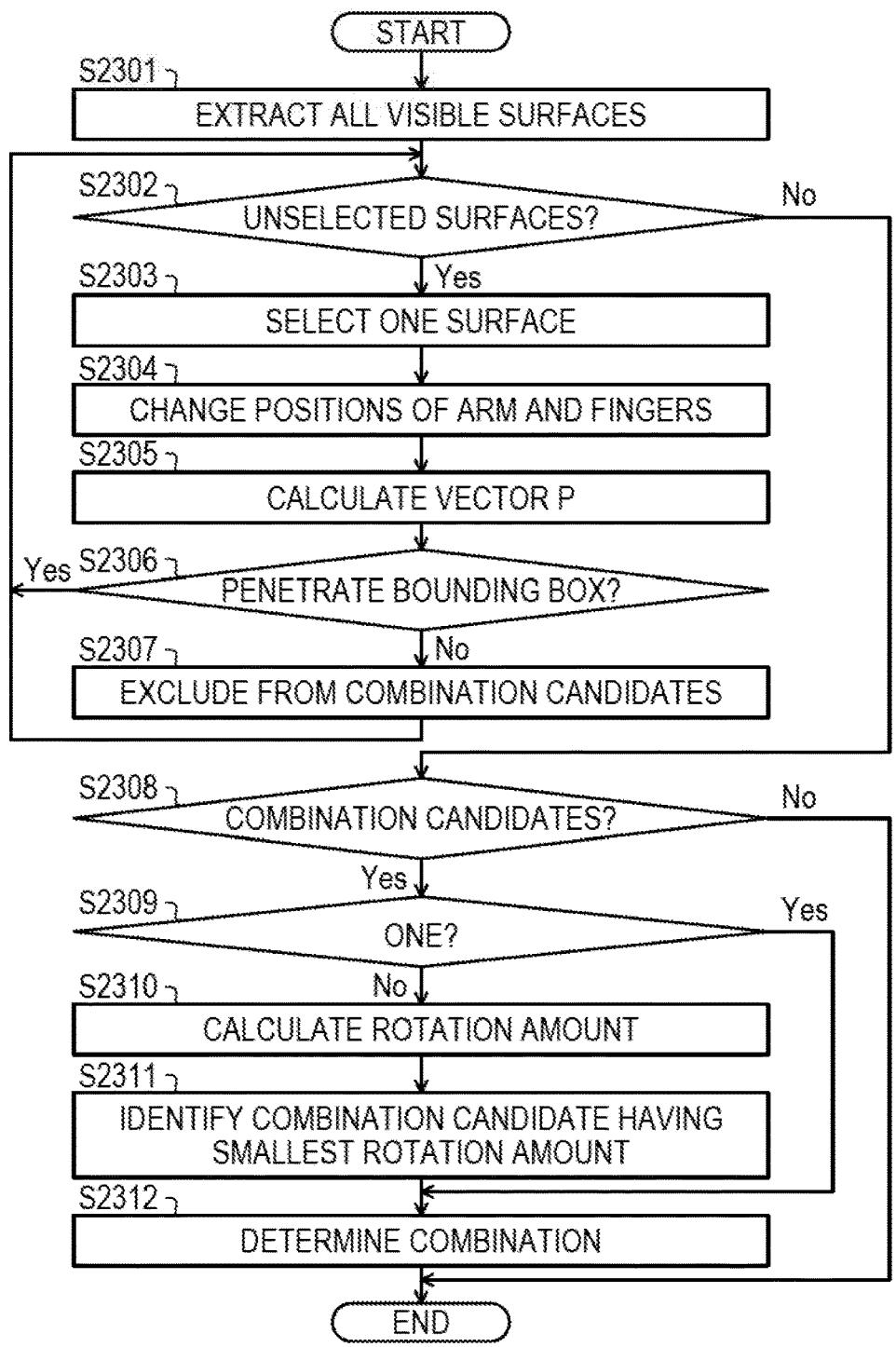
FIG. 23 is a flowchart illustrating details of the second identification processing illustrated in FIG. 20.

FIG. 23 is a flowchart illustrating details of the second identification processing illustrated in FIG. 20. The information processing apparatus 100 extracts surfaces visible when viewed from an approach direction of the arm am, among the respective surfaces of the combination candidates (S2301). The surfaces extracted by the information processing apparatus 100 in S2301 may be surfaces visible when viewed by a user through the display 509.

The information processing apparatus 100 determines whether unselected surfaces are present among the extracted surfaces (S2302). When it is determined that unselected surfaces are present (S2302: Yes), the information processing apparatus 100 selects one surface from the unselected surfaces among the extracted surfaces (S2303). The information processing apparatus 100 changes positions of the arm am and fingers so as to place a point of a thumb at the center of the selected surface (S2304).

Then, the information processing apparatus 100 calculates a vector P from the point of the thumb to a point of a forefinger (S2305). The information processing apparatus 100 determines whether the calculated vector P penetrates the bounding box bb (S2306). When it is determined that the vector P penetrates the bounding box bb (S2306: Yes), the information processing apparatus 100 returns to S2302.

When it is determined that the vector P does not penetrate the bounding box bb (S2306: No), the information processing apparatus 100 excludes a combination including the selected surface from the combination candidates of target surfaces (S2307), and returns to S2302.

When it is determined that no unselected surface is present in S2302, (S2302: No), the information processing apparatus 100 determines whether a combination candidates of target surfaces are present (S2308). When it is determined that no combination candidate is present (S2308: No), the information processing apparatus 100 terminates the series of processing.

When it is determined that combination candidates are present (S2308: Yes), the information processing apparatus 100 determines whether only one combination candidate is present (S2309). When it is determined that only one combination candidate is present (S2309: Yes), the information processing apparatus 100 proceeds to S2312.

When it is determined that a plurality of combination candidates are present (S2309: No), the information processing apparatus 100 calculates, for each of the combination candidates, a rotation amount in a case where the vector P is rotated to a vector between two surfaces of the combination candidate (S2310). Then, the information processing apparatus 100 identifies a combination candidate having a smallest rotation amount (S2311).

Then, the information processing apparatus 100 determines the combination candidate as a combination of target surfaces (S2312), and terminates the series of processing.

As described above, the information processing apparatus 100 identifies, as target surfaces, a combination of surfaces which satisfies a condition that a vector between two fingers penetrates a rectangular parallelepiped serving as a target part taken by the two fingers in the simulation space 101, among combinations of surfaces of the rectangular parallelepiped not in contact with another part. This makes it possible to verify whether a part is taken depending on an arm model.

The information processing apparatus 100 identifies a combination which satisfies a condition that a vector from the point of the first finger to the point of the second finger penetrates a rectangular parallelepiped in a case where the point of the first finger is placed at the point of one surface among two surfaces of the combination. This makes it possible to simply verify, through a rectangular parallelepiped, a method of taking a target part in a natural state when the target part is taken by two fingers.

The first finger is, for example, a thumb. The thumb is a finger that is highly likely to be used to take the target part. When the part is picked-up by two fingers, the placement of the thumb is dominant. Thus, whether a target part is taken in a natural state in a case where the thumb is placed may be verified.

One surface is a surface among two surfaces of a combination, which is visible when a target part is viewed in an approach direction of an arm included in a human body. This makes it possible to verify whether a target part is taken in a more natural state.

In the information processing apparatus 100, a combination of identified surfaces is a combination of opposing surfaces in a rectangular parallelepiped. When a target part is picked-up by two fingers, a combination of opposing surfaces may be more easily picked-up as compared to a combination of two adjacent surfaces. Thus, a verification assuming a case where a target part is picked-up by two fingers may be performed at a high speed by limiting a combination of surfaces to the combination of the opposing surfaces.

A target part is a part present in an approach direction of an arm included in a human body simulated in the simulation space 101, among a plurality of parts. Thus, taking a part in a more natural state may be reproduced without changing a posture of an arm.

The distance between two surfaces is smaller than a threshold. Accordingly, a surface that an arm model is unable to take may be excluded from target surfaces.

When there are a plurality of combinations each of which has a vector penetrating a rectangular parallelepiped, the information processing apparatus 100 identifies, as target surfaces, a combination having a smaller rotation amount to rotate a vector from a point of the first finger and a point of the second finger to a vector between two surfaces of the combination. This makes it possible to reproduce a taking of a part in a more natural state.

The finger model verification method described in the present embodiment may be implemented by executing a finger model verification program prepared in advance by a computer such as, for example, a personal computer or a workstation. The finger model verification program is recorded in a computer-readable recording medium such as, for example, a magnetic disk, an optical disk, a universal serial bus (USB), or a flash memory. The finger model verification program is read from the recording medium and executed by a computer. The finger model verification program may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
   searching for a plurality of parts that intersects with an approach direction of an arm of a human body in a simulation space;
   setting one of the plurality of parts that is nearest to the arm of the human body as a target part taken by two fingers of the arm of the human body in the simulation space;
   generating, in the simulation space, a rectangular parallelepiped surrounding the target part, the rectangular parallelepiped having a plurality of surfaces in contact with a maximum outer shape of the target part, respectively;
   identifying, among the plurality of surfaces of the generated rectangular parallelepiped, a plurality of surfaces other than a surface in contact with one of the plurality of parts that is different from the target part, the part being among the plurality of parts;
   selecting, among the identified plurality of surfaces other than the surface in contact with the one of the plurality of parts, a plurality of combinations of two surfaces that face each other in the rectangular parallelepiped, a distance between the two surfaces that face each other being shorter than a predetermined threshold value;
   identifying, among the identified plurality of surfaces other than the surface in contact with the one of the plurality of parts, a plurality of surfaces that is visible when viewed from the approach direction of the arm of the human body in the simulation space;
   changing position of the arm such that a first finger of the two fingers of the arm is placed at a center of one of the plurality of surfaces that is visible when viewed from the approach direction of the arm of the human body in the simulation space;
   calculating a first vector from a point of the first finger of the fingers of the arm to a point of a second finger of the two fingers of the arm that penetrates the rectangular parallelepiped when two surfaces among the identified plurality of surfaces other than the surface in contact with the one of the plurality of parts are taken by the two fingers of the arm of the human body in the simulation space;
   calculating a rotation amount to rotate the first vector to a second vector formed between the two surfaces of each of the plurality of combinations of two surfaces that face each other; and
   selecting, among the plurality of combinations of two surfaces that face each other, a combination having a smallest rotation amount in order to reduce the rotation amount between the first vector and the second vector.

2. The non-transitory computer-readable recording medium according to claim 1, wherein
   the first finger of the two fingers of the arm is a thumb.

3. A finger model verification method, comprising:
   searching for a plurality of parts that intersects with an approach direction of an arm of a human body in a simulation space;
   setting one of the plurality of parts that is nearest to the arm of the human body as a target part taken by two fingers of the arm of the human body in the simulation space;
   generating, in the simulation space, by a computer, a rectangular parallelepiped surrounding the target part, the rectangular parallelepiped having a plurality of surfaces in contact with a maximum outer shape of the target part, respectively;
   identifying, among the plurality of surfaces of the generated rectangular parallelepiped, a plurality of surfaces other than a surface in contact with one of the plurality of parts that is different from the target part, the first part being among the plurality of parts;
   selecting, among the identified plurality of surfaces other than the surface in contact with the one of the plurality of parts, a plurality of combinations of two surfaces that face each other in the rectangular parallelepiped, a distance between the two surfaces that face each other being shorter than a predetermined threshold value;
   identifying, among the identified plurality of surfaces other than the surface in contact with the one of the plurality of parts, a plurality of surfaces that is visible when viewed from the approach direction of the arm of the human body in the simulation space;
   changing position of the arm such that a first finger of the two fingers of the arm is placed at a center of one of the plurality of surfaces that is visible when viewed from the approach direction of the arm of the human body in the simulation space; and
   calculating a first vector from a point of the first finger of the two fingers of the arm to a point of a second finger of the two fingers of the arm that penetrates the rectangular parallelepiped when two surfaces among the identified plurality of surfaces other than the surface in contact with the one of the plurality of parts are taken by the two fingers of the arm of the human body in the simulation space;
   calculating a rotation amount to rotate the first vector to a second vector between the two surfaces of each of the plurality of combinations of two surfaces that face each other; and
   selecting, among the plurality of combinations of two surfaces that face each other, a combination having a smallest rotation amount in order to reduce the rotation amount between the first vector and the second vector.

4. An information processing apparatus, comprising:
   a memory;
   a processor coupled to the memory and the processor configured to configured to:
      search for a plurality of parts that intersects with an approach direction of an arm of a human body in a simulation space,
      set one of the plurality of parts that is nearest to the arm of the human body as a target part taken by two fingers of the arm of the human body in the simulation space,
      generate, in the simulation space, a rectangular parallelepiped surrounding a the target part, the rectangular parallelepiped having a plurality of surfaces in contact with a maximum outer shape of the target part, respectively,
      identify, among the plurality of surfaces of the generated rectangular parallelepiped, a plurality of surfaces other than a surface in contact with one of the plurality of parts that is different from the target part, the part being among the plurality of parts, select, among the identified plurality of surfaces other than the surface in contact with the one of the plurality of parts, a plurality of combinations of two surfaces that face each other in the rectangular parallelepiped, a distance between the two surfaces that face each other being shorter than a predetermined threshold value, identify, among the identified plurality of surfaces other than the surface in contact with the one of the plurality of parts, a plurality of surfaces that is visible when viewed from the approach direction of the arm of the human body in the simulation space, change position of the arm such that a first finger of the two fingers of the arm is placed at a center of one of the plurality of surfaces that is visible when viewed from the approach direction of the arm of the human body in the simulation space, calculate a vector from a point of the first finger of the two fingers of the arm to a point of a second finger of the two fingers of the arm that penetrates the rectangular parallelepiped when two surfaces among the identified plurality of surfaces other than the surface in contact with the one of the plurality of parts are taken by the two fingers of the arm of the human body in the simulation space, calculate a rotation amount to rotate the first vector to a second vector formed between the two surfaces of each of the plurality of combinations of two surfaces that face each other, and select, among the plurality of combinations of two surfaces that face each other, a combination having a smallest rotation amount in order to reduce the rotation amount between the first vector and the second vector.

* * * * *